(12) United States Patent
Badt, Jr. et al.

(10) Patent No.: US 6,496,476 B1
(45) Date of Patent: Dec. 17, 2002

(54) SYSTEM AND METHOD FOR RESTRICTED REUSE OF INTACT PORTIONS OF FAILED PATHS

(75) Inventors: Sig H. Badt, Jr., Richardson, TX (US); Sridhar Alagar, Sunnyvale, CA (US); Bryan J. McGlade, Balwyn North (AU)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/151,320

(22) Filed: Sep. 11, 1998

Related U.S. Application Data

(63) Continuation-in-part of application No. 09/038,531, filed on Mar. 11, 1998.
(60) Provisional application No. 60/040,536, filed on Mar. 12, 1997.

(51) Int. Cl.$^7$ .............................................. G01R 31/08
(52) U.S. Cl. ...................................................... 370/228
(58) Field of Search ................................. 370/221, 222, 370/225, 228, 238, 248, 249; 340/825.01, 827; 709/239

(56) References Cited

U.S. PATENT DOCUMENTS

| | | | | |
|---|---|---|---|---|
| 4,648,088 A | * | 3/1987 | Cagle et al. ................. | 370/238 |
| 4,825,206 A | | 4/1989 | Brice, Jr. et al. | |
| 4,853,927 A | | 8/1989 | Wenzel | |
| 4,884,263 A | | 11/1989 | Suzuki | |
| 4,956,835 A | | 9/1990 | Grover | |
| 5,070,497 A | | 12/1991 | Kleine-Altekamp | |
| 5,146,452 A | | 9/1992 | Perkarske | |
| 5,173,689 A | * | 12/1992 | Kusano ...................... | 340/827 |
| 5,189,662 A | | 2/1993 | Kleine-Atlekamp | |
| 5,212,475 A | | 5/1993 | Thoma | |
| 5,218,601 A | * | 6/1993 | Chujo et al. ................. | 370/222 |
| 5,233,600 A | * | 8/1993 | Pekawske ................... | 370/248 |

(List continued on next page.)

FOREIGN PATENT DOCUMENTS

| | | |
|---|---|---|
| WO | 96/41440 | 12/1996 |
| WO | 97/48189 | 12/1997 |

OTHER PUBLICATIONS

Bouloutas et al. "Alarm Correlation and Fault Identification in Communication Networks"; 1994 IEEE Transactions and Communications.

Manione et al.; "An Inconsistencies Tolerant Approach in the Fault Design of Telecommunications Network"; Feb. 14, 1994.

*Primary Examiner*—Melvin Marcelo
*Assistant Examiner*—Phuongchau Ba Nguyen

(57) ABSTRACT

In a path-based distributed restoration algorithm provisioned telecommunications network, the origin and destination nodes of a failed path are apprised of the portions of the path that remain intact by "reuse" messages that are sent from the custodial nodes that are adjacent to the failure. As each reuse message reaches an intermediate node, the node ID of the intermediate node is appended to a field of the message so that, as the reuse messages are propagated along the intact portions of the failed path, a cumulative list of nodes that are encountered by the messages passing from the custodial nodes to the origin and destination nodes is set forth. Thus, the origin/destination node, when in receipt of a reuse message, can read from the field that has the cumulative list of nodes a description of the intact portions remaining from the original path. These intact portions are preferably used only for restoring of the same path that included the portions prior to failure and are not available for restoring any other paths that happened to fail simultaneously.

16 Claims, 21 Drawing Sheets

U.S. PATENT DOCUMENTS

| | | | |
|---|---|---|---|
| 5,235,599 A | * 8/1993 | Nishimura et al. | 340/825 |
| 5,319,632 A | 6/1994 | Iwasaki | |
| 5,325,366 A | 6/1994 | Shinbashi | |
| 5,435,003 A | * 7/1995 | Chng et al. | 395/575 |
| 5,455,832 A | 10/1995 | Bowmaster | |
| 5,479,608 A | 12/1995 | Richardson | |
| 5,493,273 A | 2/1996 | Smurlo et al. | |
| 5,495,471 A | * 2/1996 | Chow et al. | 340/827 |
| 5,537,532 A | * 7/1996 | Chng et al. | 395/182.02 |
| 5,548,639 A | 8/1996 | Ogura | |
| 5,586,112 A | 12/1996 | Tabata | |
| 5,590,118 A | 12/1996 | Nederlof | |
| 5,590,119 A | 12/1996 | Moran et al. | |
| 5,598,403 A | * 1/1997 | Tatsuki | 340/827 |
| 5,623,481 A | 4/1997 | Russ | |
| 5,636,203 A | * 6/1997 | Shah | 370/244 |
| 5,636,206 A | 6/1997 | Amemiya et al. | |
| 5,646,936 A | 7/1997 | Shah et al. | |
| 5,657,320 A | 8/1997 | Russ et al. | |
| 5,680,326 A | 10/1997 | Russ et al. | |
| 5,710,777 A | * 1/1998 | Gawne | 370/225 |
| 5,721,727 A | 2/1998 | Ashi et al. | |
| 5,734,687 A | 3/1998 | Kainulaimen | |
| 5,748,611 A | * 5/1998 | Allen et al. | 370/228 |
| 5,748,617 A | 5/1998 | McLain, Jr. | |
| 5,757,774 A | 5/1998 | Oka | |
| 5,781,535 A | 7/1998 | Russ et al. | |
| 5,802,144 A | 9/1998 | Laird et al. | |
| 5,812,524 A | * 9/1998 | Moran et al. | 370/228 |
| 5,832,196 A | * 11/1998 | Croslin et al. | 370/228 |
| 5,838,660 A | 11/1998 | Croslin | |
| 5,841,759 A | * 11/1998 | Russ et al. | 370/221 |
| 5,850,505 A | 12/1998 | Grover et al. | |
| 5,852,600 A | 12/1998 | Russ | |
| 5,862,125 A | * 1/1999 | Russ | 370/228 |
| 5,862,362 A | 1/1999 | Somasegar et al. | |
| 5,867,689 A | 2/1999 | McLain, Jr. | |
| 5,875,172 A | 2/1999 | Tabata | |
| 5,933,422 A | * 8/1999 | Kusano et al. | 370/228 |
| 5,943,314 A | 8/1999 | Croslin | |
| 5,991,338 A | 11/1999 | Trommel | |
| 5,999,286 A | 12/1999 | Venkatesan | |
| 6,021,113 A | 2/2000 | Doshi et al. | |
| 6,026,073 A | * 2/2000 | Brown et al. | 370/229 |
| 6,026,077 A | 2/2000 | Iwata | |
| 6,044,064 A | 3/2000 | Brimmage et al. | |
| 6,049,529 A | 4/2000 | Brimmage et al. | |
| 6,104,695 A | 8/2000 | Wesley et al. | |
| 6,108,309 A | 8/2000 | Cohoe et al. | |
| 6,137,775 A | 10/2000 | Barlett et al. | |
| 6,154,448 A | 11/2000 | Peterson et al. | |
| 6,167,025 A | 12/2000 | Hsing et al. | |

* cited by examiner

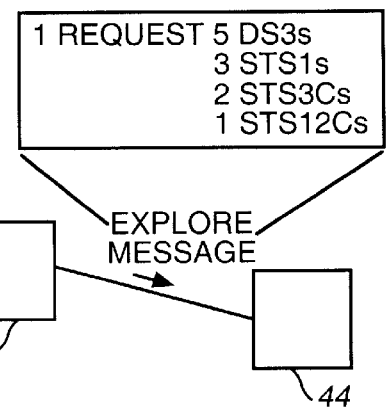
FIG. 32
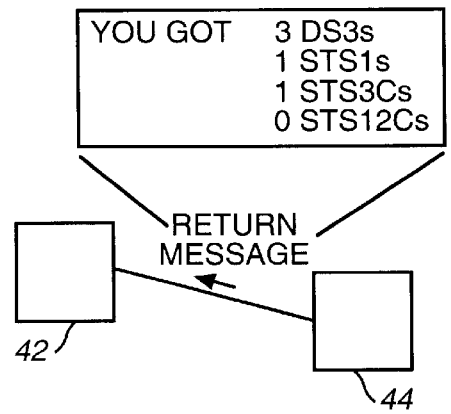
FIG. 33
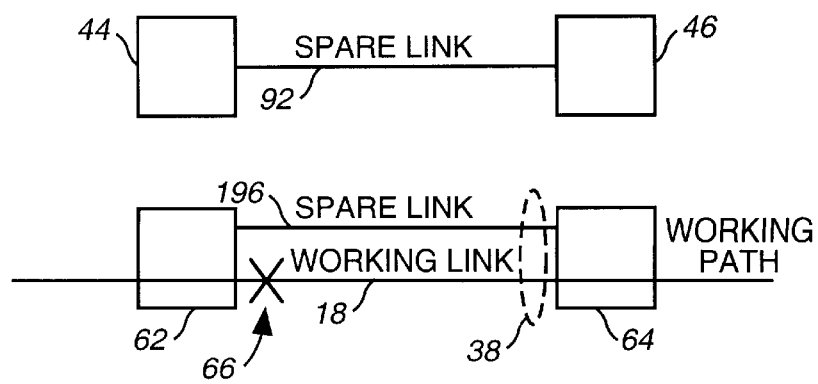
FIG. 34
FIG. 35

SYSTEM AND METHOD FOR RESTRICTED REUSE OF INTACT PORTIONS OF FAILED PATHS

CROSS REFERENCE TO RELATED APPLICATIONS

This application is a continuation-in-part of patent application Ser. No. 09/038,531 filed on Mar. 11, 1998, which claims priority under 35 U.S.C. §119(e) to provisional patent application Ser. No. 60/040,536, filed Mar. 12, 1997.

TECHNICAL FIELD OF THE INVENTION

This invention relates to telecommunications network and more particularly to a messaging method therefor by which the origin and destination nodes of a failed path can receive information on which spans or links remain usable in the failed path.

BACKGROUND OF THE INVENTION

A telecommunications network comprises a plurality of nodes connected together by spans and links. These spans and links are for the most part fiber optical cables. A path is defined in the network as the connection between the two end nodes by which information or traffic can traverse. One of these end nodes is defined as an origin node while the other is the destination node. There could be a number of paths that connect the origin node to the destination node. And if one of those paths that carries the traffic is disrupted, another path can be used as an alternate for rerouting the traffic. Thus, for such path based approach for restoring disrupted traffic in a telecommunications network that is provisioned with a distributed restoration algorithm (DRA), the origin and destination nodes are taken into consideration.

In a telecommunications network, it is likely that when a fault occurs, only a single link or span along a path is affected. Such catastrophic event may be due to, for example, a cable cut. The remainder of the path through the network on either side of the failure may therefore remain intact and could be used for circumventing the failed portion. Yet a path-based DRA provisioned network nonetheless may disregard the intact portions and seek a completely different alternate route for restoring the traffic. This can be a problem because indiscriminate selection of a candidate path to restore one failed path can preclude the restoration of other simultaneously, or subsequently failed paths, as damage to a single span in a network can cause the failure of many paths that may happen to pass through the same span. Therefore, a DRA provisioned network must take into account all such end-to-end paths that need to be restored in order to ensure the highest possible degree of restoration following a failure.

There is therefore a need for an improved DRA provisioned path-based restoration scheme that allows the intact portions of a failed path to be ascertained and made available for forming alternate restoration paths, to thereby improve the efficiency and the completeness of the restoration.

SUMMARY OF THE INVENTION

To enable the DRA provisioned network to utilize the intact portions of a failed path, the present invention messaging technique provides information to both the origin and destination nodes of a failed path on which spans or links remain intact leading up to the point of failure.

To achieve this end, the failure is first detected by the adjacent custodial nodes bracketing the fault. Each of these custodial nodes adjacent to the failure then would initiate the propagation of a "reuse" message to either the origin node or the destination node. This reuse message has a variable length route information field and an identifier identifying it as a reuse message. As the reuse message is propagated from node to node back to the origin or destination node, each node through which the reuse message passes would append its own unique node identification (ID) to the route information field. Thus, when an origin or destination node receives the reuse message, it can read from the route information field of the reuse message a description of the intact portion of the path.

By allowing the restoration logic to take into account the intact portions of the original paths, better restoration decisions making use of the intact portions of the path can take place. In a preferred embodiment, such restoration logic is only permitted to apply the intact portions to the restoration of the failed path that originally included the portions. In other words, such intact portions are restricted for use in restoring the failed path. Such restriction considerably simplifies the restoration process and avoids the possibility of unforeseen problems.

It is therefore an objective of the present invention to provide a method of communicating the description of the intact portions of a failed path to the origin and destination nodes of a failed path.

It is yet another objective of the present invention to provide a method of determining the portions of a failed path that remain usable for carrying traffic.

It is moreover an objective of the present invention to provide a method for identifying the reusable links or spans that connect nodes of a failed path so that these links or spans can be used by an alternate path for restoring the disrupted traffic.

BRIEF DESCRIPTION OF THE FIGURES

The above-mentioned objectives and advantages of the present invention will become more apparent and the invention itself will be best understood by reference to the following description of an embodiment of the invention taken in conjunction with the accompanying drawings, wherein:

FIGS. 32 and 33 illustrate the explore phase and return phase, respectively, applicable to hybrid networks;

FIG. 34 shows the time diagram including an extra iteration for processing hybrid networks according to the teachings of the present invention;

FIGS. 35 and 36 illustrate a lower quality spare according to the teachings of the present invention;

DETAILED DESCRIPTION OF THE PRESENT INVENTION

Figure 1:
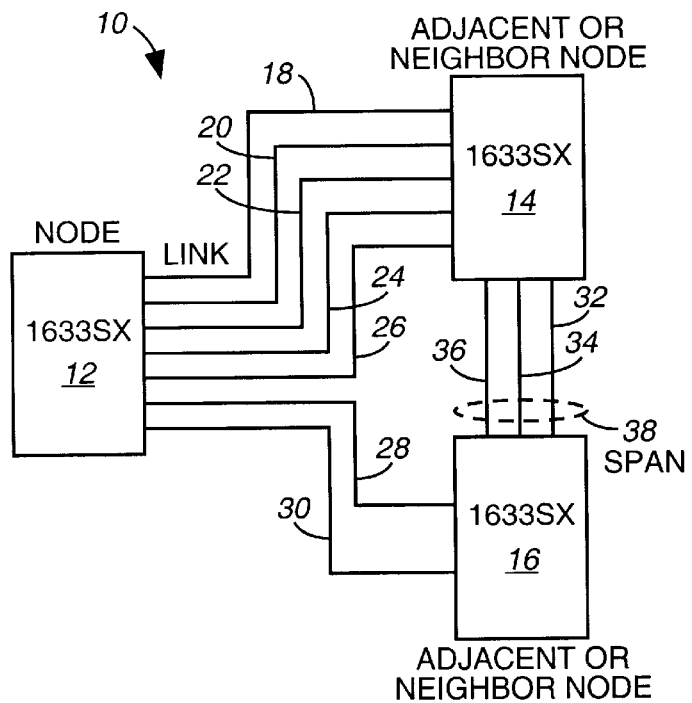
FIG. 1 conceptually illustrates a simplified telecommunications restoration network to provide certain definitions applicable to the present invention.

FIG. 1 shows telecommunications network portion 10, that includes node 12 that may communicate with node 14 and node 16, for example. Connecting between node 12 and 14 may be a set of links such as links 18 through 26, as well as for example, links 28 through 30 between node 12 and node 16. Node 14 and node 16 may also communicate between one another through links 32 through 36, for example, which collectively may be thought of as a span 38.

The following description uses certain terms to describe the concepts of the present invention. The term 1633SX is a cross-connect switch and is here called a "node." Between nodes are links, which may be a DS-3, and STS-1, which is essentially the same thing as a DS-3, but which conforms to a different standard. A link could be an STS-3, which is three STS-1s multiplexed together to form a single signal. A link may also be a STS-12, which is twelve STS-1s multiplexed together, or a link could be an STS-12C, which is twelve STS-11s, which are actually locked together to form one large channel. A link, however, actually is one unit of capacity for the purposes of the present invention. Thus, for purposes of the following description, a link is a unit of capacity connecting between one node and another. A span is to be understood as all of the links between two adjacent nodes. Adjacent nodes or neighbor nodes are connected by a bundle, which itself is made up of links.

For purposes of the present description, links may be classified as working, spare, failed, or recovered. A working link is a link that currently carries traffic. Spare links are operable links that are not currently being used. A spare link may be used whenever the network desires to use the link. A failed link is a link that was working, but has failed. A recovered link is a link that, as will be described more completely below, was part of a path that failed but its itself intact and available for inclusion in a restoration path.

Figure 2:
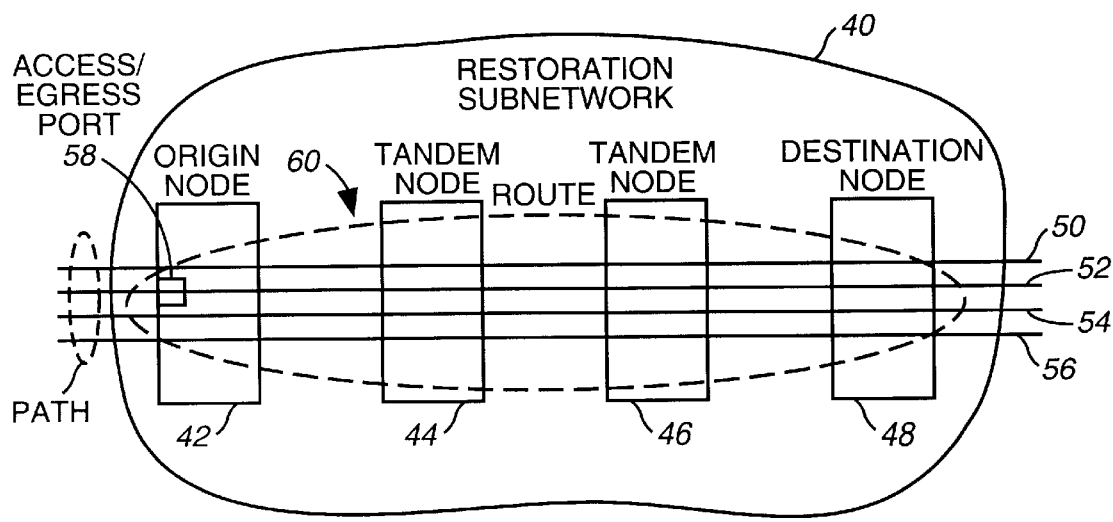
FIG. 2 illustrates a restoration subnetwork for illustrating concepts applicable to the present invention.

FIG. 2 illustrates the conceptual example of restoration subnetwork 40 that may include node 42 that, through tandem nodes 44 and 46, connects to node 48. In restoration subnetwork 40, a path, such as paths 50, 52, 54, and 56, includes connections to nodes 42 through 48, for example, as well as links between these nodes. As restoration subnetwork 40 depicts, each of the paths enters restoration subnetwork 40 from outside restoration subnetwork 40 at node 42.

In the present embodiment, each of nodes 42 through 48 is associated with a numerical node identifier. In a preferred restoration process embodying the present invention, the nodes compare node identifier numbers to determine which node is the origin and which node is the destination with respect to a given path between the two nodes. If node 42 possesses a node identifier value that is lower than that of node 48, then node 42 is deemed to be the origin node and node 48 is deemed to be the destination node. This resolution determines the complementary roles that nodes 42 and 48 are to play in performing restoration of a failed path between the two nodes.

The present invention establishes restoration subnetwork 40 that may be part of an entire telecommunications network 10. Within restoration subnetwork 40, there may be numerous paths 50. A path 50 includes a number of links 18 strung together and crossconnected through the nodes 44. The path 50 does not start within restoration subnetwork 40, but may start at a customer premise or someplace else. In fact, a path 50 may originate outside a given telecommunications network 10. The point at which path 50 enters the restoration subnetwork 40, however, is origin node 42. The point on origin node 42 at which path 50 comes into restoration subnetwork 40 is access/egress port 58. In a restoration subnetwork, a span failure may occur between two tandem nodes. The two tandem nodes on either side of the failure are designated as the "custodial" nodes with respect to the failed span. One such failed span may affect many paths through the span and may therefore give rise to many origin/destination pairs seeking to restore connection.

Figure 3:
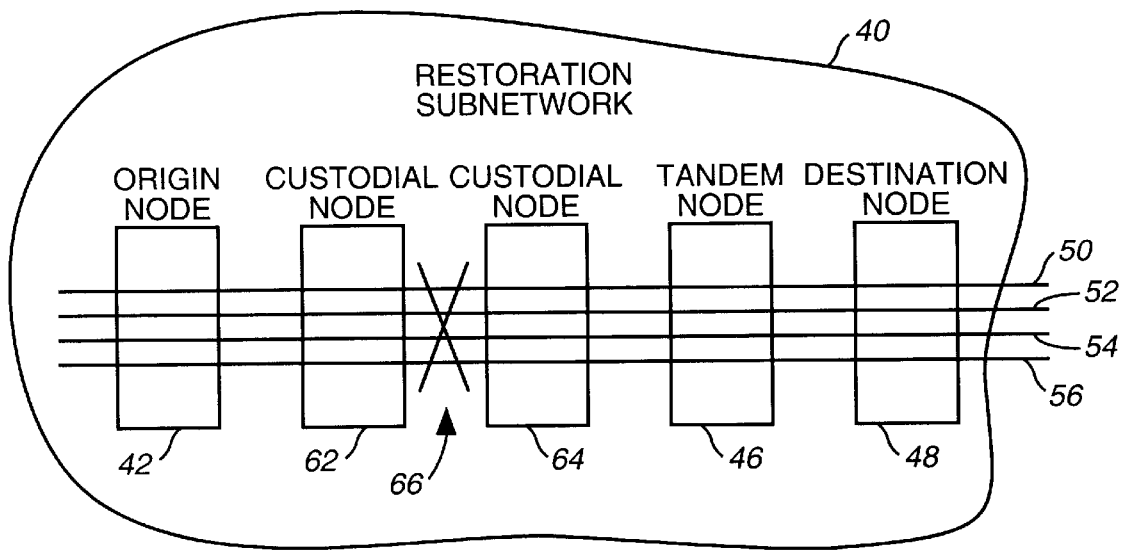
FIG. 3 conceptually shows a failure within a restoration subnetwork.
Figure 4:
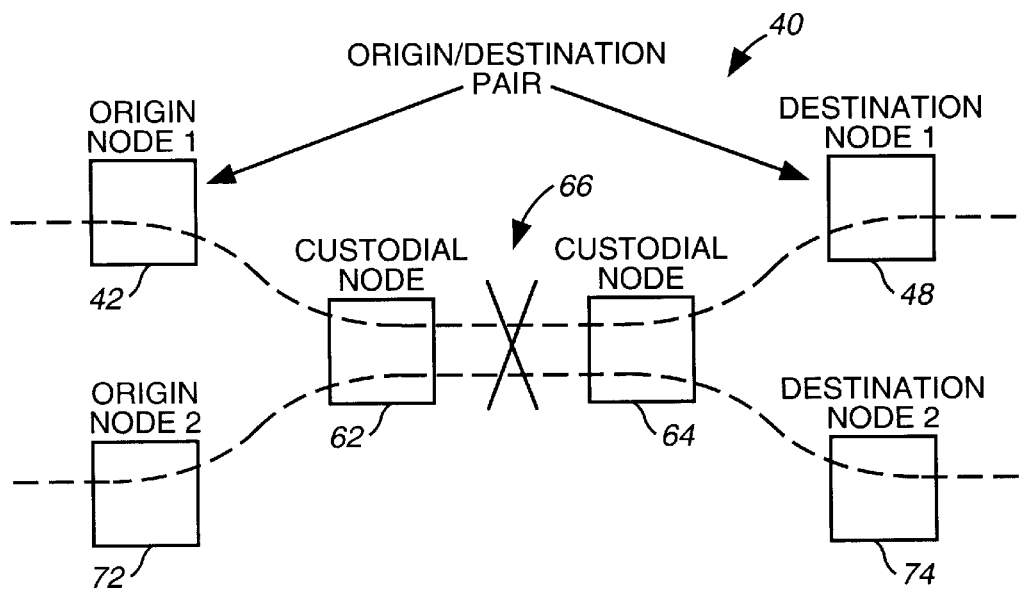
FIG. 4 illustrates two origins/destination nodes pairs for demonstrating the applicable scope of the present invention.

FIG. 3 illustrates the concept of custodial nodes applicable to the present invention. Referring again to restoration subnetwork 40, custodial nodes 62 and 64 are the tandem nodes positioned on each side of failed span 66. Custodial nodes 62 and 64 bound the failed link and communicate this failure, as will be described below. FIG. 4 illustrates the aspect of the present invention for handling more than one origin-destination node pair in the event of a span failure. Referring to FIG. 4, restoration subnetwork 40 may include, for example, origin node 42 that connects through custodial nodes 62 and 64 to destination node 48. Within the same restoration subnetwork, there may be more than one origin node, such as origin node 72. In fact, origin node 72 may connect through custodial node 62 and custodial node 64 to destination node 74. As in FIG. 3, FIG. 4 shows failure 66 that establishes custodial nodes 62 and 64.

The present invention has application for each origin/destination pair in a given restoration subnetwork. The following discussion, however, describes the operation of the present invention for one origin/destination pair. Obtaining an understanding of how the present invention handles a single origin/destination pair makes clear how the algorithm may be extended in the event of several origin/destination pairs becoming active at the same time. An important consideration for the present invention, however, is that even a single point of failure may produce numerous origin/destination pairs.

Figure 5A:
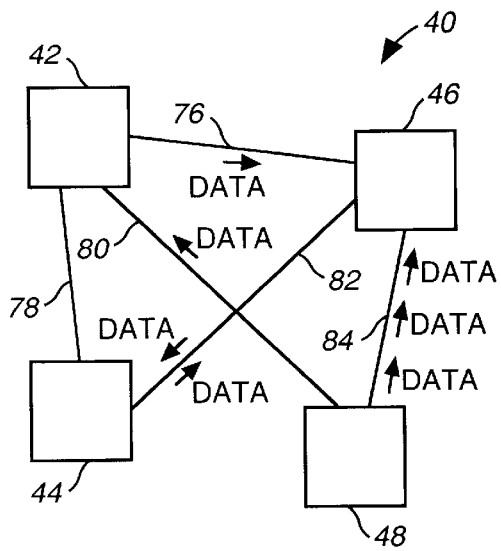
FIGS. 5A and 5B illustrate the loose synchronization features of the present invention.
Figure 5B:
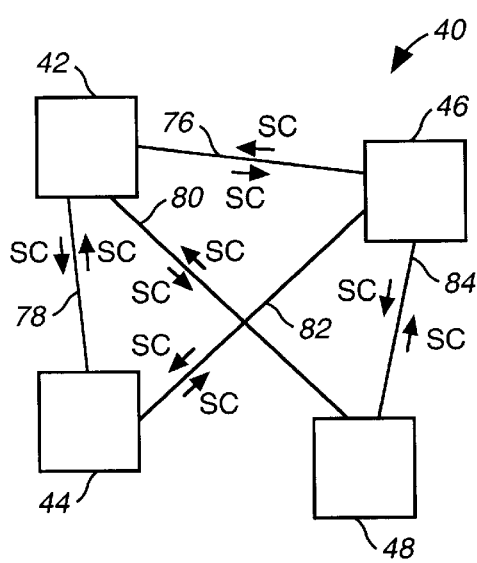

FIGS. 5A and 5B illustrate the concept of loose synchronization according to the present invention. "Loose synchronization" allows operation of the present method and system as though all steps were synchronized according to a centralized clock. Known restoration algorithms suffer from race conditions during restoration that make operation of the restoration process unpredictable. The restoration configuration that results in a given network, because of race conditions, depends on which messages arrive first. The present invention eliminates race conditions and provides a reliable result for each given failure. This provides the ability to predict how the restored network will be configured, resulting in a much simpler restoration process.

Referring to FIG. 5A, restoration subnetwork 40 includes origin node 42, that connects to tandem nodes 44 and 46. Data may flow from origin node 42 to tandem node 46, along data path 76, for example. Origin node 42 may connect to tandem node 44 via path 78. However, path 80 may directly connect origin node 42 with destination node 48. Path 82 connects between tandem node 44 and tandem node 46. Moreover, path 84 connects between tandem node 46 and destination node 48. As FIG. 5A depicts, data may flow along path 76 from origin node 42 to tandem node 46, and from destination node 48 to origin node 42. Moreover, data may be communicated between tandem node 44 and tandem node 46. Destination node 49 may direct data to origin node 42 along data path 80, as well as to tandem node 46 using path 84.

These data flows will all take place in a single step. At the end of a step, each of the nodes in restoration subnetwork 40 sends a "step complete" message to its neighboring node. Continuing with the example of FIG. 5A, in FIG. 5B there are numerous step complete messages that occur within restoration subnetwork 40. In particular, step complete message exchanges occur between origin node 42 and tandem node 44 on data path 78, between-origin node 42 and tandem node 46 on data path 76, and between origin node 42 and destination node 48 on data path 80. Moreover, tandem node 46 exchanges "step complete" messages with tandem node 44 on data path 82, and between tandem node 46 and destination node 48 on data path 84.

In the following discussion, the term "hop count" is part of the message that travels from one node to its neighbor. Each time a message flows from one node to its neighbor, a "hop" occurs. Therefore, the hop count determines how many hops the message has taken within the restoration subnetwork. The restoration algorithm of the present invention may be partitioned into steps. Loose synchronization assures that in each step a node processes the message it receives from its neighbors in that step. Loose synchronization also makes the node send a step complete message to every neighbor. If a node has nothing to do in a given step, all it does is send a step complete message. When a node receives a step complete message from all of its neighbors, it increments a step counter associated with the node and goes to the next step.

Once a node receives step complete messages from every neighbor, it goes to the next step in the restoration process. In looking at the messages that may go over a link, it is possible to see a number of messages going over the link. The last message, however, will be a step complete message. Thus, during the step, numerous data messages are exchanged between nodes. At the end of the step, all the nodes send step complete messages to their neighbors to indicate that all of the appropriate data messages have been sent and it is appropriate to go to the next step. As a result of the sequential message traffic, i.e. data, step complete, data, step complete, etc., a basic synchronization occurs.

In practice, although the operation is not as synchronized as it may appear in the associated FIGUREs, synchronization occurs. During the operation of the present invention, messages travel through the restoration subnetwork at different times. However, loose synchronization prevents data messages from flowing through the restoration subnetwork until all step complete messages have been received at the nodes. It is possible for one node to be at step 3, while another node is at step 4. In fact, at some 'places within the restoration subnetwork, there may be even further step differences between nodes. This helps minimize the effects of slower nodes on the steps occurring within the restoration subnetwork.

The steps in the process of the present invention may be thought of most easily by considering them to be numbered. The process, therefore, starts at step 1 and proceeds to step 2. There are predetermined activities that occur at each step and each node possesses its own step counter. However, there is no master clock that controls the entire restoration subnetwork. In other words, the network restoration process of the present invention may be considered as a distributive restoration process. With this configuration, no node is any different from any other node. They all perform the same process independently, but in loose synchronization.

Figure 6:
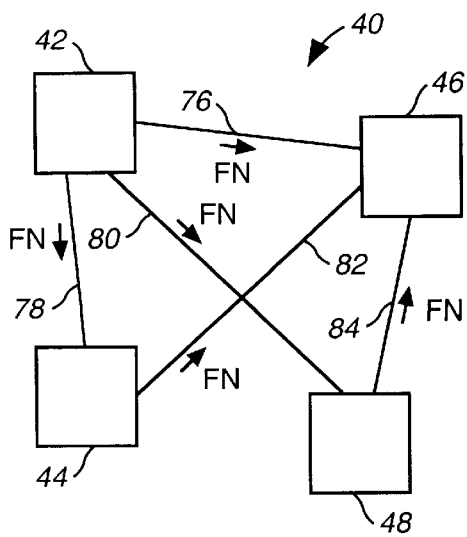
FIG. 6 shows the failure notification message flow applicable to the present invention.

FIG. 6 shows the typical form of a failure notification message through restoration subnetwork 40. If, for example, origin node 42 desires to start a restoration event, it first sends failure notification messages to tandem node 44 via data path 78, to tandem node 46 via data path 76, and destination node 48 via data path 80. As FIG. 6 further shows, tandem node 44 sends failure notification message to tandem node 46 on path 82, as does destination node 48 to tandem node 46 on path, 84.

The process of the present invention, therefore, begins with a failure notification message. The failure notification message is broadcast throughout the restoration subnetwork to begin the restoration process from one node to all other nodes. Once a node receives a failure message, it sends the failure notification message to its neighboring node, which further sends the message to its neighboring nodes. Eventually the failure notification message reaches every node in the restoration subnetwork. Note that if there are multiple failures in a network, it is possible to have multiple failure notification messages flooding throughout the restoration subnetwork simultaneously.

The first failure notification message initiates the restoration algorithm of the present invention. Moreover, broadcasting the failure notification message is asynchronous in the sense that as soon as the node receives the failure notification message, it broadcasts the message to its neighbors without regard to any timing signals. It is the failure notification message that begins the loose synchronization process to begin the restoration process of-the present invention at each node within the restoration subnetwork. Once a node begins the restoration process, a series of events occurs.

Note, however, that before the restoration process of the present invention occurs, numerous events are already occurring in the restoration subnetwork. One such event is the transmission and receipt of keep alive messages that neighboring nodes exchange between themselves.

Figure 7:
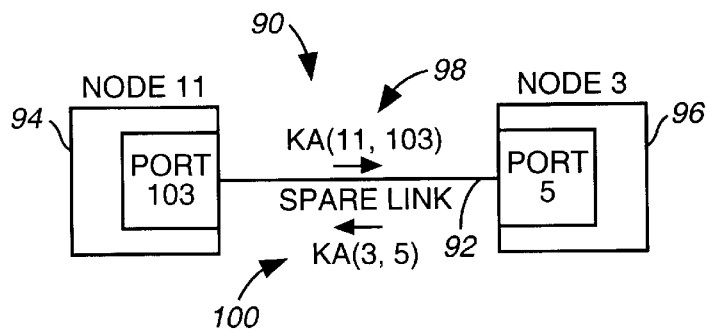
FIG. 7 illustrates the flow of keep-alive messages according to the present invention.

FIG. 7 illustrates the communication of keep-alive messages that the restoration process of the present invention communicates on spare links, for the purpose of identifying neighboring nodes. Referring to FIG. 7, configuration 90 shows the connection via spare link 92 between node 94 and node 96. Suppose, for example, that node 94 has the numerical designation "11", and port designation "103". Suppose further that node 96 has the numerical designation 3 and the port designation "5". On spare link 92, node 94 sends keep-alive message 98 to node 96, identifying its node number "11" and port number "103". Also, from node 96, keep-alive message 100 flows to node 94, identifying the keep-alive message as coming from the node having the numerical value "3", and its port having the numerical value "5".

The present invention employs keep-alive signaling using the C-bits of the DS-3 formatted messages in restoration subnetwork 40, the available spare links carry DS-3 signals, wherein the C-bits convey special keep-alive messages. In particular, each keep-alive message contains the node identifier and port number that is sending the message, the WAN address of the node, and an "I am custodial node" indicator to be used for assessing spare quality.

An important aspect of the present invention relates to signaling channels, which refers to the means by which cross-connect nodes communicate with one another. There are two kinds of communications the cross-connect switch-ing can perform. One is called in-band, another is out-of-band. With in-band communication, node-node signaling travels over the same signal path or communications channel as the working traffic. The communication travels over the same physical media as the path or the same physical media as the link. With out-of-band signals, there is freedom to deliver the signals between cross-connect switches in any way possible. Out-of-band signals generally enables a much higher data rate.

In FIG. 7, for example, in-band messages are piggybacked on links. Out-of-band message traffic may flow along any other possible path between two nodes. With the present invention, certain messages must flow in-band. These include the keep-alive message, the path verification message, and the signal fail message. There are some signaling channels available to the restoration process of the present invention, depending on the type of link involved. This includes SONET links and asynchronous links, such as DS-3 links.

A distinguishing feature between SONET links and DS-3 links is that each employs a different framing standard for which unique and applicable equipment must conform. It is not physically possible to have the same port serve as a SONET port and as a DS-3 port at the same time. In SONET signal channeling, there is a feature called tandem path overhead, which is a signaling channel that is part of the signal that is multiplexed together. It is possible to separate this signal portion from the SONET signaling channel. Because of the tandem path overhead, sometimes called the Z5 byte, there is the ability within the SONET channel to send messages.

On DS-3 links, there are two possible signaling channels. There is the C-bit and the X-bit. The C-bit channel cannot be used on working paths, but can only be used on spare or recovered links. This is because the DS-3 standard provides the option of using the C-bit or not using the C-bit. If the C-bit format signal is used, then it is possible to use the C-bit for signaling. However, in this instance, working traffic does not use that format. Accordingly, the C-bit is not available for signaling on the working channels. It can be used only on spare links and on recovered links.

Figure 8:
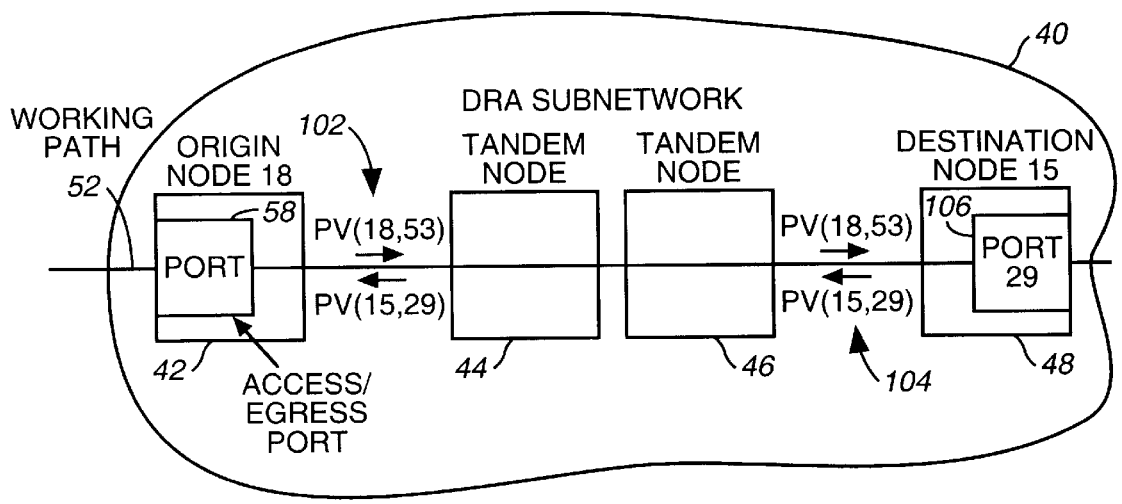
FIG. 8 illustrates the flow of path verification messages according to the teachings of the present invention.

FIG. 8 illustrates in restoration subnetwork 40 the flow of path verification messages from origin node 42 through tandem nodes 44 and 46 to destination node 48. Path verification message 102 flows from origin node 42 through tandem nodes 44 and 46 to destination node 48. In particular, suppose origin node 42 has the label 18, and that working path 52 enters port 58. Path verification message 102, therefore, contains the labels 18 and 53, and carries this information through tandem nodes 44 and 46 to destination node 48. Destination node 48 includes the label 15 and egress port 106 having the label 29. Path verification message 104 flows through tandem node 46 and 44 to origin node 42 for the purpose of identifying destination node 48 as the destination node for working path 52.

A path verification message is embedded in a DS-3 signal using the X-bits which are normally used for very low speed single-bit alarm signaling. In the present invention, the X-bit state is overridden with short bursts of data to communicate signal identity to receptive equipment downstream. The bursts are of such short duration that other equipment relying upon traditional use of the X-bit for alarm signaling will not be disturbed.

The present invention also provides for confining path verification signals within a network. In a DRA-controlled network, path verification messages are imbedded in traffic-bearing signals entering the network and removed from signals leaving the network. Inside of the network, propagation of such signals is bounded based upon the DRA-enablement status of each port. The path verification messages identify the originating node and the destination node. The path verification messages occur on working links that are actually carrying traffic. The path verification message originates at origin node 42 and the restoration subnetwork and passes through tandem nodes until the traffic reaches destination node 48. Tandem nodes 44 and 46 between the origin node 42 and destination node 48, for example, can read the path verification message but they cannot modify it. At destination node 48, the path verification message is stripped from the working traffic to prevent its being transmitted from the restoration subnetwork.

The present invention uses the X-bit to carry path verification message 104. One signal format that the present invention may use is the ITU-standardized DS-3 signal format. While it is possible to easily provide a path verification message on SONET traffic, the DS-3 traffic standard does not readily permit using path verification message 104. The present invention overcomes this limitation by adding to the DS-3 signal, without interrupting the traffic on this signal and without causing alarms throughout the network, path verification message 104 on the DS-3 frame X-bit.

The DS-3 standard specifies that the signal is provided in frames. Each frame has a special bit in it called the X-bit. In fact, there are two X-bits, X-1 and X-2. The original purpose of the X-bit, however, was not to carry path verification message 104. The present invention provides in the X-bit the path verification message. This avoids alarms and equipment problems that would occur if path verification message 104 were placed elsewhere. An important aspect of using the X-bit for path-verification message 104 with the present embodiment relates to the format of the signal. The present embodiment sends path verification message 104 at a very low data rate, for example, on the order of five bits per second. By sending path verification message 104 on the X-bit very slowly, the possibility of causing an alarm in the network is significantly reduced. Path verification message 104 is sent at a short burst, followed by a long waiting period, followed by a short burst, followed by a long waiting period, etc. This method of "sneaking" path verification message 104 past the alarms permits using path verification message 104 in the DS-3 architecture systems.

Figure 9:
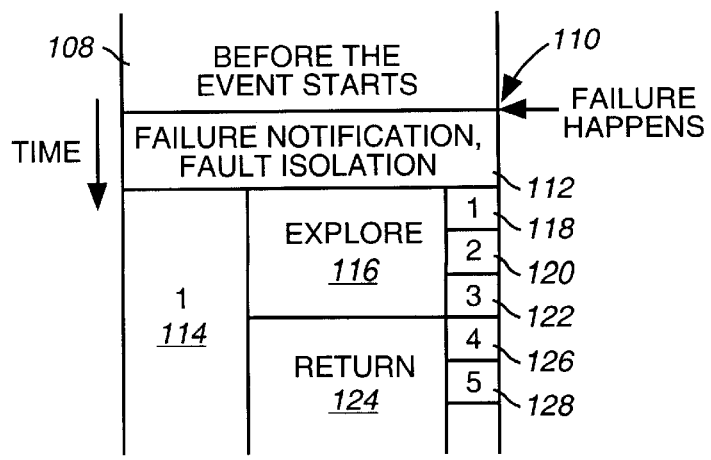
FIG. 9 shows a time diagram applicable to the failure notification and fault isolation process of the present invention.

FIG. 9 shows conceptually a timeline for the restoration process that the present invention performs. With time moving downward, time region 108 depicts the network status prior to a failure happening at point 110. At the point that a failure happens, the failure notification and fault isolation events occur in time span 112. Upon completion of this step, the first generation of the present process occurs, as indicated by space 114. This includes explore phase 116 having, for example three steps 118, 120 and 122. Return phase 124 occurs next and may include at least two steps 126 and 128. These steps are discussed more completely below.

Once a failure occurs, the process of the present invention includes failure notification and fault isolation phase 112. Failure notification starts the process by sending failure notification messages throughout the restoration subnetwork. Fault isolation entails determining which nodes are the custodial nodes. One reason that it is important to know the custodial nodes is that there are spares on the same span as the failed span. The present invention avoids using those spares if possible, because they are also highly likely to fail. Fault isolation, therefore, provides a way to identify which nodes are the custodial nodes and identifies the location of the fault along the path.

Figure 10:
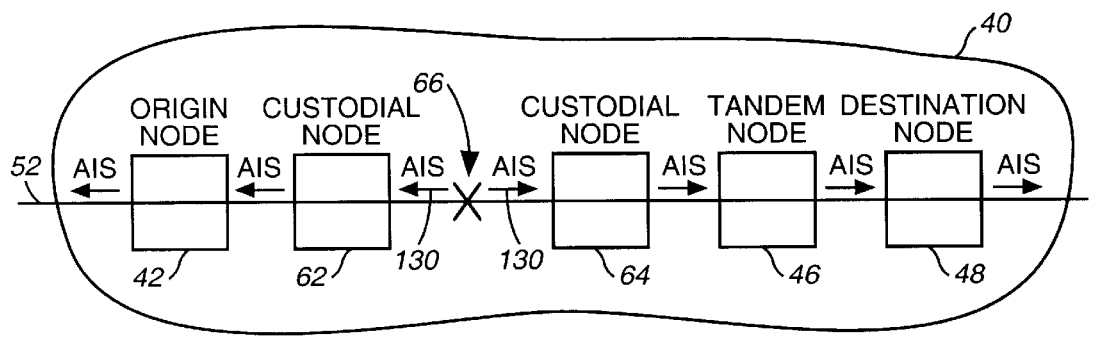
FIGS. 10 and 11 illustrate the AIS signal flow within the restoration subnetwork of the present invention.

FIG. 10 illustrates the flow of standard Alarm Indication Signals (AIS) 130 through restoration subnetwork 40. In the event of failure 66 between custodial nodes 62 and 64, the AIS message 130 travels through custodial node 62 to origin node 42 and out restoration subnetwork 40. Also, AIS message 130 travels through custodial node 64 and tandem node 46, to destination node 48 before leaving restoration subnetwork 40. This is the normal way of communicating AIS messages 130. Thus, normally every link on a failed path sees the same AIS signal.

Figure 11:
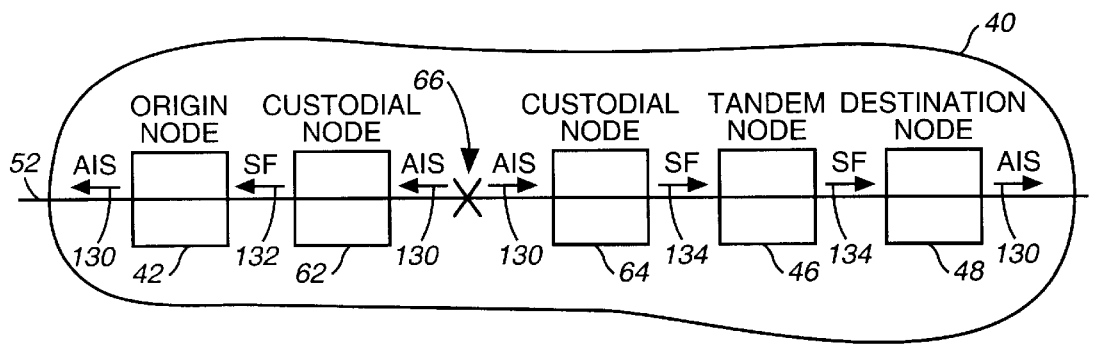

FIG. 11, on the other hand, illustrates the conversion of AIS signal 130 to "signal fail" signals 132 and 134. SF message 132 goes to origin node 42, at which point it is reconverted to AIS message 132.

Next, signal 134 passes through tandem node 46 en route to destination node 48,—which reconverts SF message 134 to AIS message 130.

FIGS. 10 and 11, therefore, illustrate how the DS-3 standard specifies operations within the restoration subnetwork for a DS-3 path including origin node 42 and destination node 48, with one or more tandem nodes 46. Custodial nodes 62 and 64 are on each side of the link failure 66. AIS signal 130 is a DS-3 standard signal that indicates that there is an alarm upstream. Moreover, AIS signal 130 could actually be several different signals. AIS signal 130 propagates downstream so that every node sees exactly the same signal.

With AIS signal 130, there is no way to determine which is a custodial node 62, 64 and which is the tandem node 44, 46. This is because the incoming signal looks the same to each receiving node. The present embodiment takes this into consideration by converting AIS signal 130 to a signal fail or SF signal 132. When tandem node 46 sees SF signal 134, it propagates it through until it reaches destination node 48 which converts SF signal 134 back to AIS signal 130.

Another signal that may propagate through the restoration subnetwork 40 is the ISF signal. The ISF signal is for a signal that comes into the restoration subnetwork and stands for Incoming Signal Fail. An ISF signal occurs if a bad signal comes into the network. if it comes in as an AIS signal, there is the need to distinguish that, as well. In the SONET standard there is already an ISF signal. The present invention adds the SF signal, as previously mentioned. In the DS-3 standard, the SF signal already exists. The present invention adds the ISF signal to a DS-3 environment. Consequently, for operation of the present invention in the DS-3 standard environment, there is the addition of the ISF signal. For operation in the SONET standard environment, the present invention adds the SF signal. Therefore, for each of the standards, the present invention adds a new signal.

To distinguish whether an incoming non-traffic signal received by a node has been asserted due to an alarm within a DRA-controlled network, a modified DS-3 idle signal is propagated downstream in place of the usual Alarm Indication Signal (AIS). This alarm-produced idle signal differs from a normal idle signal by an embedded messaging in the C-bit maintenance channel to convey the presence of a failure within the realm of a particular network. The replacement of AIS with idle is done to aid fault isolation by squelching downstream alarms. Upon leaving the network, such signals may be converted back into AIS signals to maintain operational compatibility with equipments outside the network. A comparable technique is performed in a SONET network, where STS-N AIS signals are replaced with ISF signal and the Z5 byte conveys the alarm information.

Another aspect of the present invention is the ability to manage unidirectional failures. In a distributed restoration environment, failures that occur along one direction of a bidirectional link are handled by first verifying that the alarm signal persists for a period of time and then propagating an idle signal back along the remaining working direction. This alarm produced idle signal differs from a normal idle signal by embedded messaging in the C-bit maintenance channel to convey the presence of a far end receive failure. In this manner, custodial nodes are promptly identified and restorative switching is simplified by treating unidirectional failures as if they were bidirectional failures.

Figure 12:
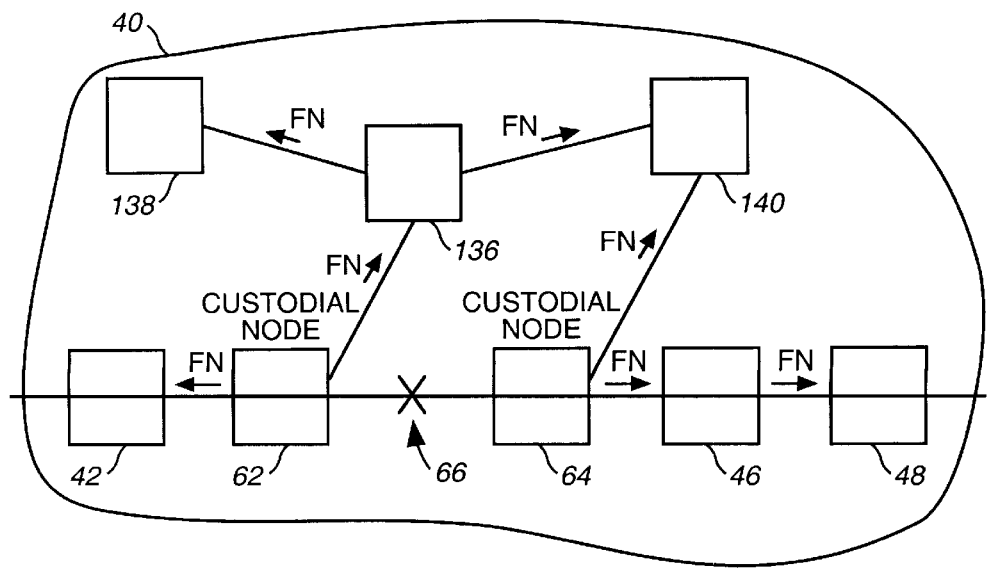
FIG. 12 describes more completely the failure notification message flow within the restoration subnetwork according to the present invention.

FIG. 12 illustrates the broadcast of failure notification messages from custodial nodes 62 and 64. As FIG. 12 depicts, custodial node 62 sends a failure notification to origin node 42, as well as to tandem node 136. Tandem node 136 further broadcasts the failure notification message to tandem nodes 138 and 140. In addition, custodial node 64 transmits a failure notification message to tandem node 46, which further transmits the failure notification message to destination node 48. Also, custodial node 64 broadcasts the failure notification message to tandem node 140.

Figure 13:
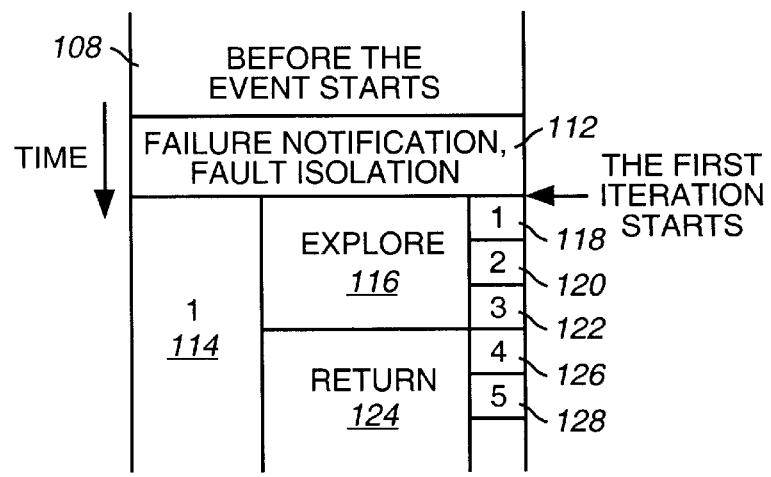
FIG. 13 illustrates the beginning of an iteration of the restoration process of the present invention.
Figure 14:
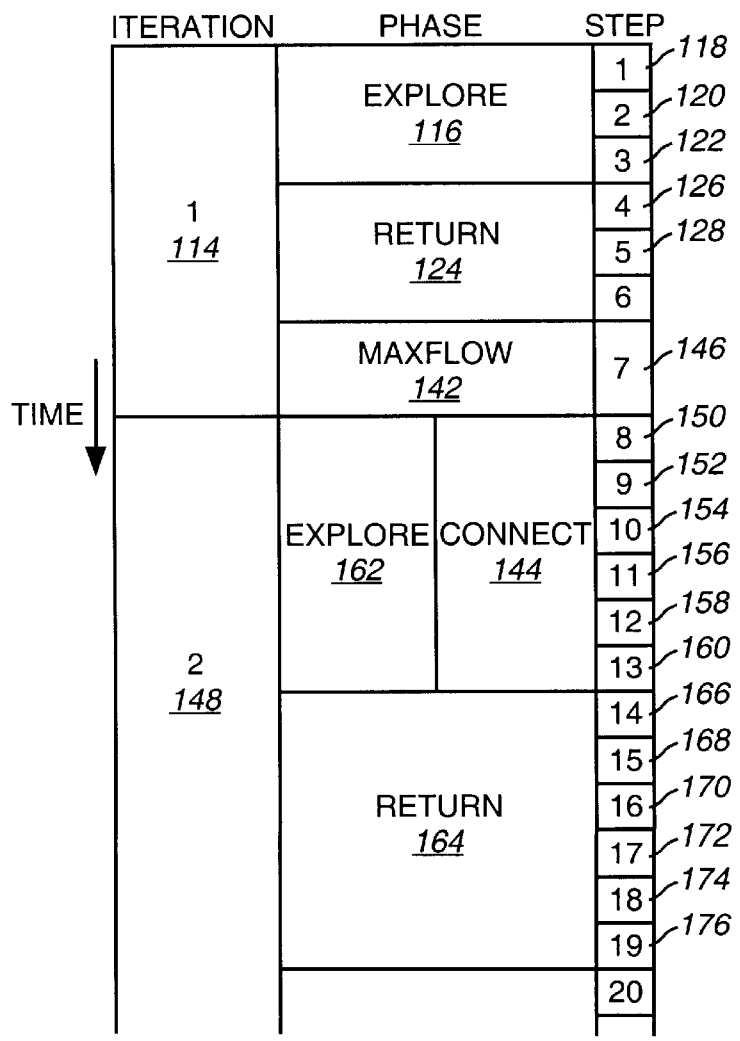
FIG. 14 provides a time diagram applicable to the explore, return, max flow and connect phases of the first iteration of the restoration process of the present invention.

FIG. 13 illustrates the time diagram for the first iteration following fault isolation. In particular, FIG. 13 shows the time diagram for explore phase 116 and return phase 124 of iteration 1. FIG. 14 further illustrates the time diagram for the completion of iteration 1 and a portion of iteration 2. As FIG. 14 indicates, iteration 1 includes explore phase 116, return phase 124, max flow phase 142 and connect phase 144. Max flow phase 142 includes a single step 146. Note that connect phase 144 of iteration 2 shown by region 148 includes six steps, 150 through 160, and occurs simultaneously with explore phase 162 of iteration 2. Note further that return phase 164 of iteration 2 also includes six steps 166 through 176.

Each iteration involves explore, return, maxflow, and connect phases. The restored traffic addressed by connect message and the remaining unrestored traffic conveyed by the explore message are disjoint sets. Hence, there is no conflict in concurrently propagating or combining these messaging steps in a synchronous DRA process. In conjunction with failure queuing, this practice leads to a restoration process that is both reliably coordinated and expeditious.

The iterations become longer in duration and include more steps in subsequent iterations. This is because with subsequent iterations, alternate paths are sought. A path has a certain length in terms of hops. A path may be three hops or four hops, for example. In the first iteration, for example, a hop count may be set at three. This, means that alternate paths that are less than or equal to three hops are sought. The next iteration may seek alternate paths that are less than or equal to six hops.

Setting a hop count limit per iteration increases the efficiency of the process of the present invention. With the system of the present invention, the number of iterations and the number of hop counts for each iteration is configurable. However, these may also be preset, depending on the degree of flexibility that a given implementation requires. Realize, however, that with increased configurability, increased complexity results. This increased complexity may, in some instances, generate the possibility for inappropriate or problematic configurations.

Figure 15:
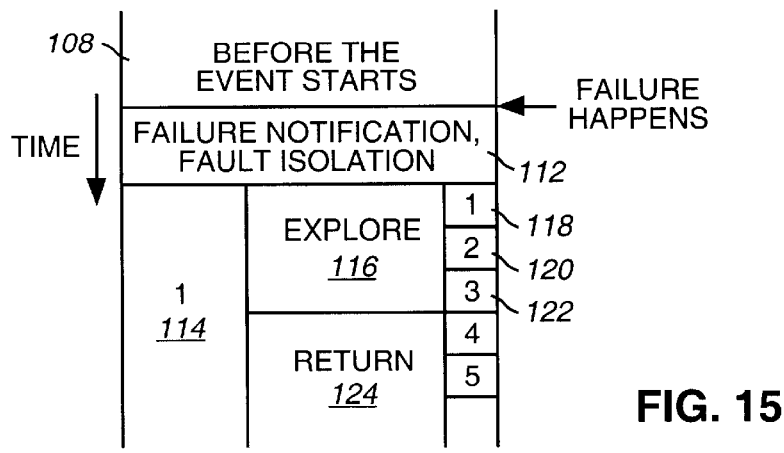
FIG. 15 provides a time diagram associated with the explore phase of the process of the present invention.
Figure 16:
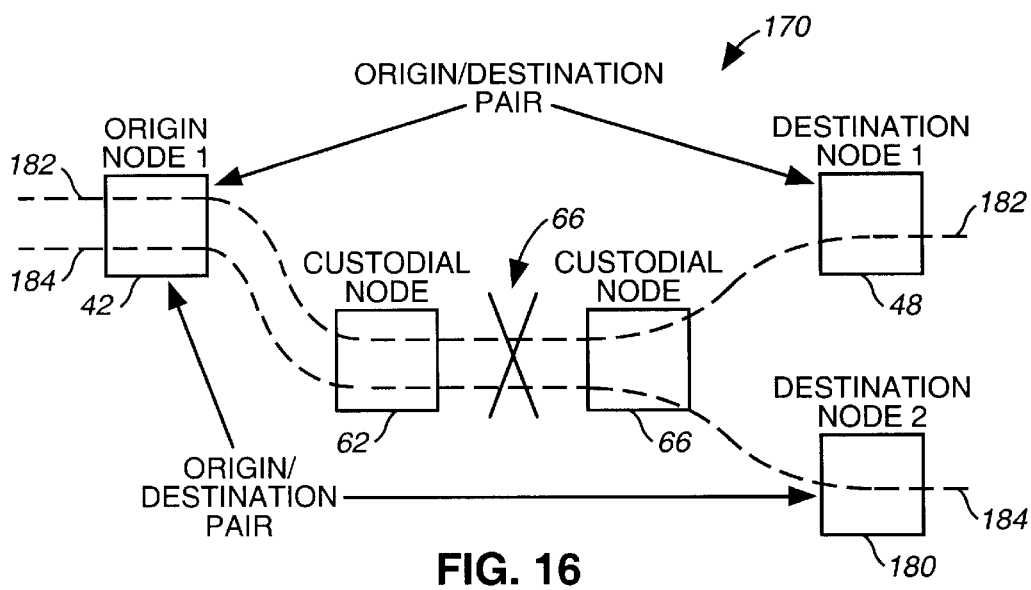
FIG. 16 illustrates the possible configuration of multiple origins/destination node pairs from a given origin node.

FIG. 15, for promoting the more detailed discussion of the explore phase, shows explore phase 116, which is the initial part of the first iteration 114. FIG. 16 shows restoration network portion 170 to express the idea that a single origin node 42 may have more than one destination node. In particular, destination node 180 may be a destination node for origin node 42 through custodial nodes 62 and 66. Also, as before, destination node 48 is a destination node for origin node 42. This occurs because two working paths, 182 and 184, flow through restoration subnetwork portion 170, both beginning at origin node 42. During the explore phase, messages begin at the origin nodes and move outward through the restoration subnetwork. Each explore message is stored and forwarded in a loosely synchronized manner. Accordingly, if a node receives the message in step 1, it forwards it in step 2. The neighboring node that receives the explore message in step 1 transmits the explore message to its neighboring node in step 2. Because the present invention employs loose synchronization it does not matter how fast the message is transmitted from one neighbor to another, it will be sent at the next step irrespectively.

If the explore phase is three steps long, it may flood out three hops and no more. The following discussion pertains to a single origin-destination pair, but there may be other origin/destination pairs performing the similar or identical functions at the same time within restoration subnetwork 40. If two nodes send the explore message to a neighboring node, only the first message received by the neighboring node is transmitted by the neighboring node. The message that is second received by the neighboring node is recognized, but not forwarded. Accordingly, the first node to reach a neighboring node with an explore message is generally the closest node to the neighboring node. When an explore message reaches the destination node, it stops. This step determines the amount of spare capacity existing in the restoration subnetwork between the origin node and the destination node.

Because of loose synchronization, the first message that reaches destination node 48 from origin node 42 will signify the shortest available path. There are no race conditions within the present invention's operation. In the explore message, the distance between the origin node and destination node is included. This distance, measured in hops, is always equal to or less than the number of steps allowed for the given explore phase. For example, if a destination node is five hops from the origin node by the shortest path, the explore phase with a three hop count limit will never generate a return message. On the other hand, an explore phase with a six hop count limit will return the five hop count information in the return message.

In the explore message there is an identification of the origin-destination pair to identify which node sent the explore message and the destination node that is to receive the explore message. There is also a request for capacity. The message may say, for example, that there is the need for thirteen DS-3s, because thirteen DS-3s failed. In practice, there may be not just DS-3s, but also STS-1s, STS-12C's, etc. The point being, however, that a certain amount of capacity is requested. At each node that the explore message passes through, the request for capacity is noted. The explore phase is over once the predetermined number of steps have been completed. Thus, for example, if the explore phase is to last three steps, at step 4, the explore phase is over. This provides a well-defined end for the explore phase.

Figure 17:
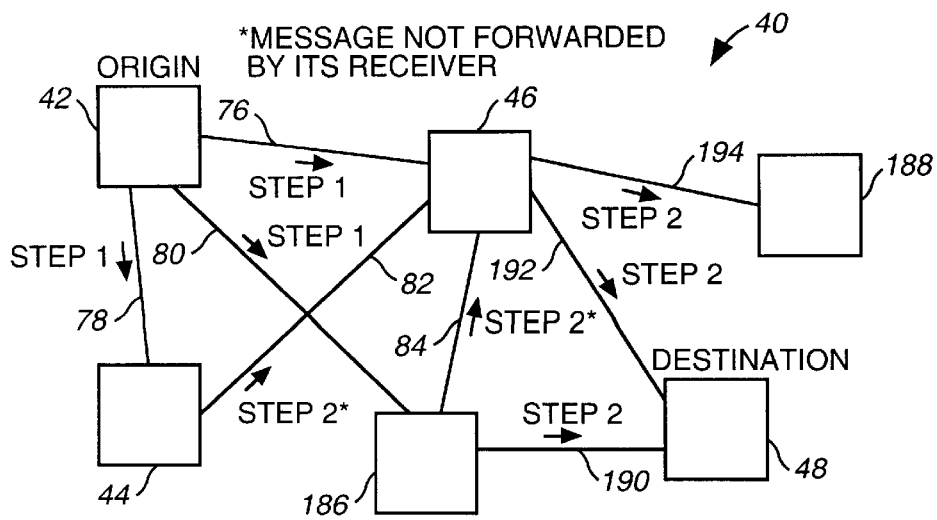
FIG. 17 depicts two steps of the explore phase of the first iteration of the restoration process.

FIG. 17 illustrates restoration subnetwork 40 for a single-origin destination pair, including origin node 42 and destination node 48. In restoration subnetwork 40, origin node 42, at the beginning of the explore phase, takes step 1 to send an explore message to tandem node 44, tandem node 46 and tandem node 186. At step 2, tandem node 46 sends an explore message to tandem node 188 and to destination node 48. At step 2, tandem node 44 sends an explore message to tandem node 46, tandem node 46 sends an explore message to tandem node 188, and to destination node 48, and tandem node 186 sends explore messages to tandem node 46 and to destination node 48. Note that explore messages at step 2 from tandem node 44 to tandem node 46 and from tandem node 186 to tandem node 46 are not forwarded by tandem node 46.

Figure 18:
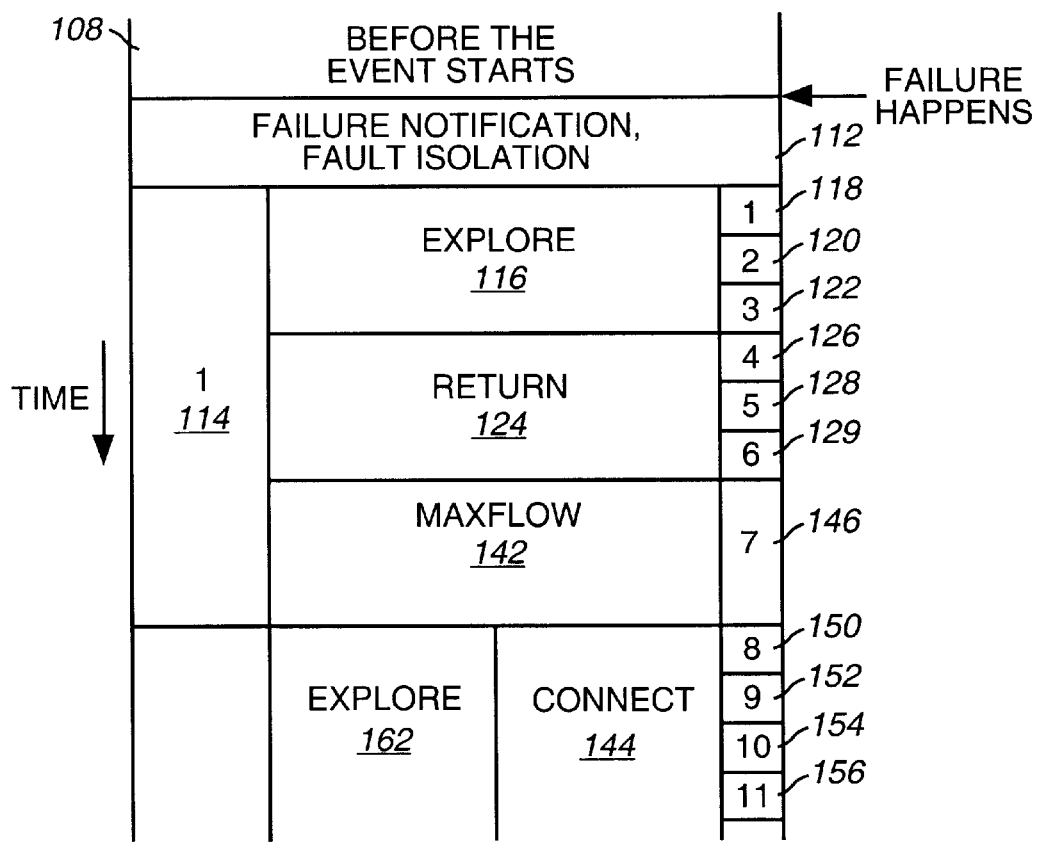
FIG. 18 provides a time diagram applicable to the return phase of the restoration process of the present invention.

FIG. 18 illustrates the time diagram for the next phase in the restoration process of the present invention, the return phase 24, which during the first iteration, includes three steps, 126, 128 and 129.

Figure 19:
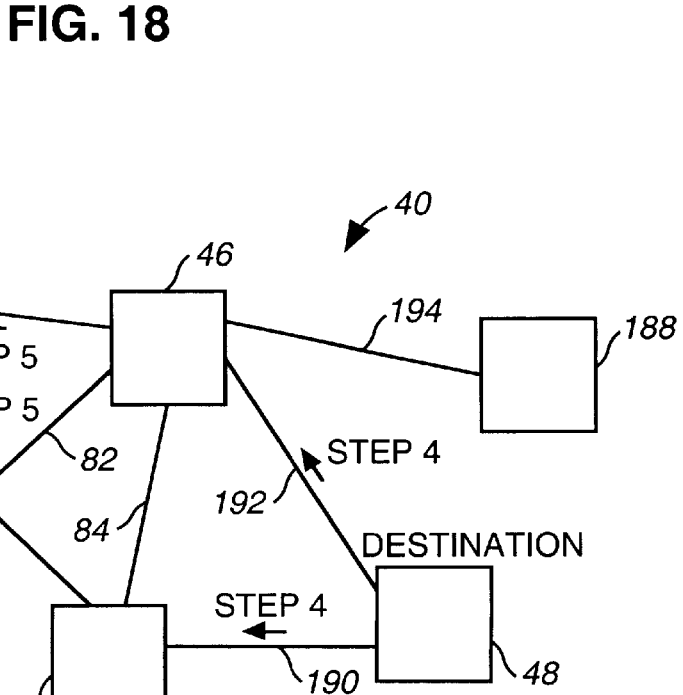
FIG. 19 shows steps associated with the return phase of the present process.

FIG. 19 illustrates the return phase of the present invention, during the first iteration. Beginning at destination node 48, at step 4, return message flows on path 192 to tandem node 46, and on path 190 to tandem node 186. At step 5, the return message flows on path 76 to origin node 42. Also, from tandem node 186, a return message flows to origin node 42.

During the return phase, a return message flows over the same path traversed by its corresponding explore phase, but in the opposite direction. Messages come from the destination node and flow to the origin node. In addition, the return phase messages are loosely synchronized as previously described. The return phase messages contain information relating to the number of spare links available for connecting the origin node to the destination node.

In the return phase, information relating to the available capacity goes to the origin node. Beginning at destination node 48, and continuing through each tandem node 44, 46, 186 en route to origin node 42, the return message becomes increasingly longer. The return message, therefore, contains information on how much capacity is available on each span en route to the origin node. The result of the return message received is the ability to establish at the origin node a map of the restoration network showing where the spare capacity exists that is usable for the restoration.

Figure 20:
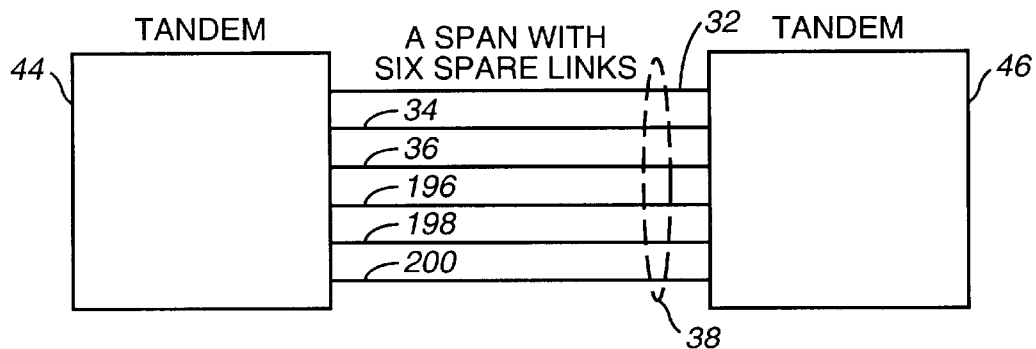
FIGS. 20, 21 and 22 illustrates the link allocation according to the return phase of the present invention.
Figure 21:
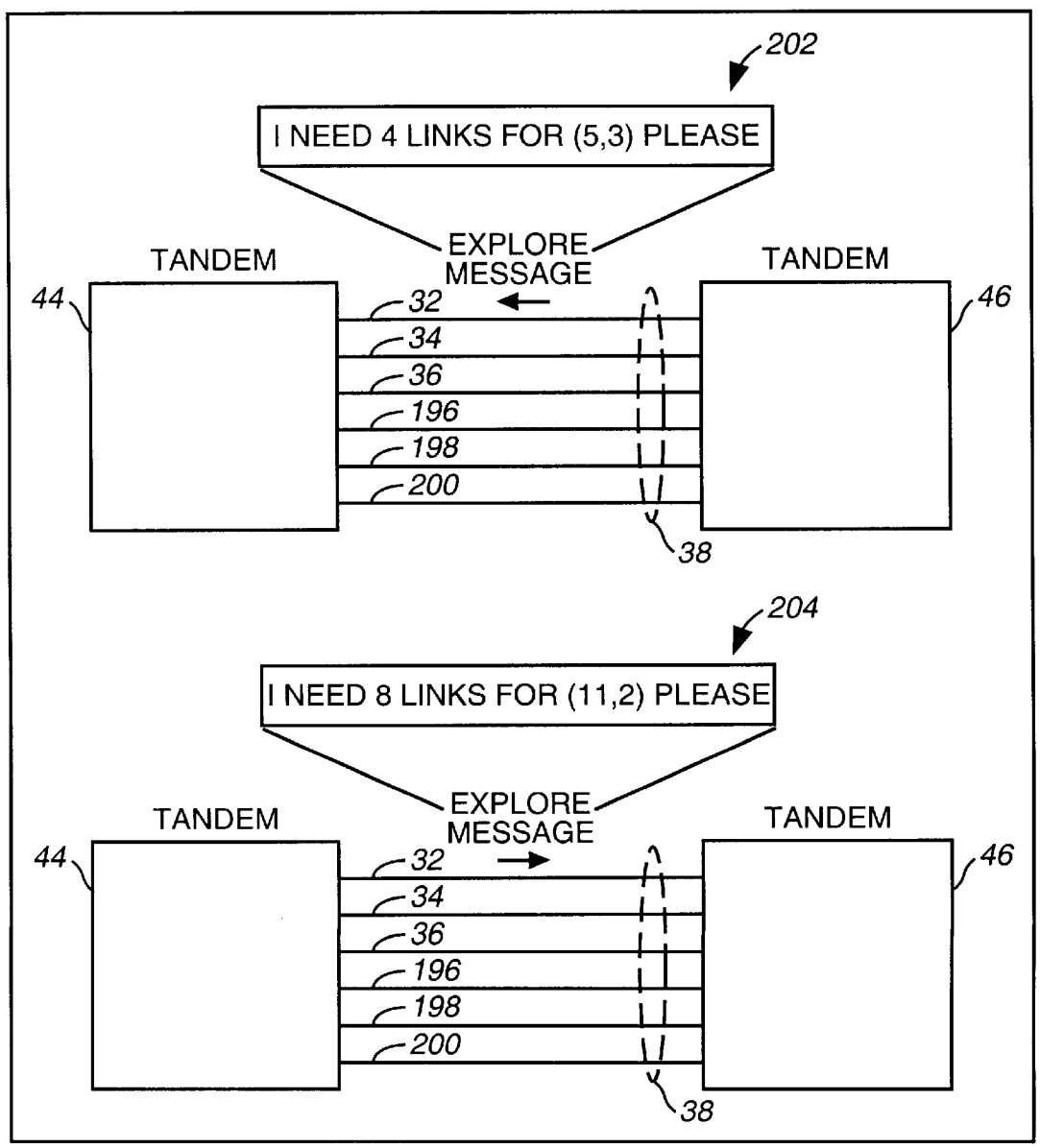
Figure 22:
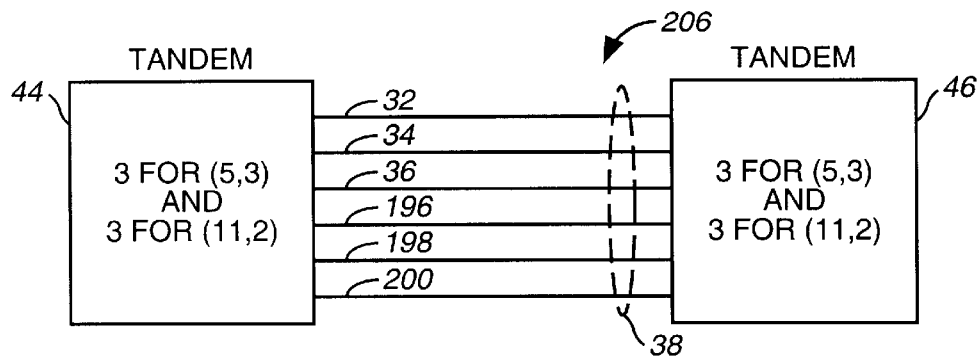

FIG. 20 illustrates tandem node 44, that connects to tandem node 46 through span 38. Note that span 38 includes six links 32, 34, 36, 196, 198 and 200. FIGS. 21 and 22 illustrate the allocation of links between the tandem nodes 44, 46 according to the preferred embodiment of the present invention. Referring first to FIG. 21, suppose that in a previous explore phase, span 38 between tandem nodes 44 and 46 carries the first explore message (5,3) declaring the need for four links for node 46, such as scenario 202 depicts. Scenario 204 shows further a message (11,2) requesting eight link flows from tandem node 44, port 2.

FIG. 22 illustrates how the present embodiment allocates the six links of span 38. In particular, in response to the explore messages from scenarios 202 and 204 of FIG. 21, each of tandem nodes 44 and 46 knows to allocate three links for each origin destination pair. Thus, between tandem nodes 44 and 46, three links, for example links 32, 34 and 36 are allocated to the (5,3) origin destination pair. Links 196, 198 and 200, for example, may be allocated to the origin/destination pair (11,2).

Figure 23:
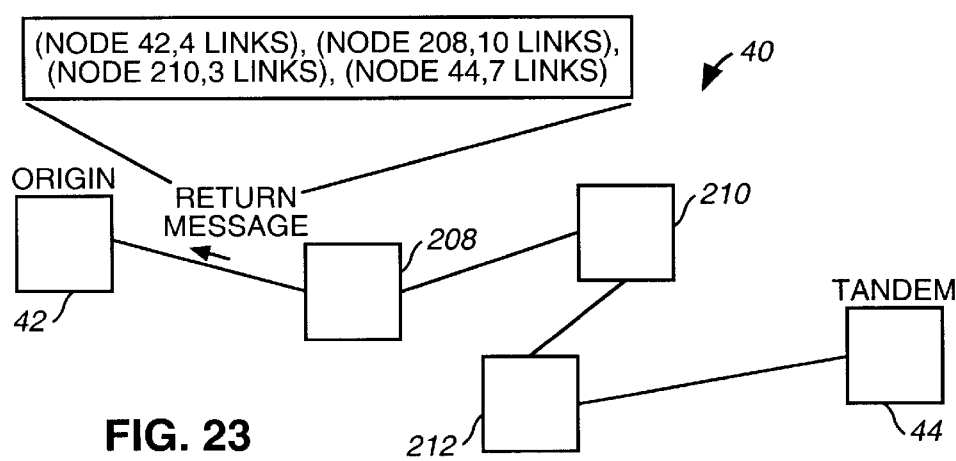
FIG. 23 illustrates a typical return message for receipt by the origin node of a restoration subnetwork.

FIG. 23 illustrates the results of the return phase of the present invention. Restoration subnetwork 40 includes origin node 42, tandem nodes 208, 210 and 212, as well as tandem node 44, for example. As FIG. 23 depicts, return messages carry back with them a map of the route they followed and how much capacity they were allocated on each span. Origin node 42 collects all the return messages. Thus, in this example, between origin node 42 and tandem node 44, four links were allocated between origin node 42 and node 208. Tandem node 208 was allocated ten links to tandem node 210. Tandem node 210 is allocated three links, with tandem node 17. And tandem node 17 is allocated seven links with tandem node 44.

Figure 24:
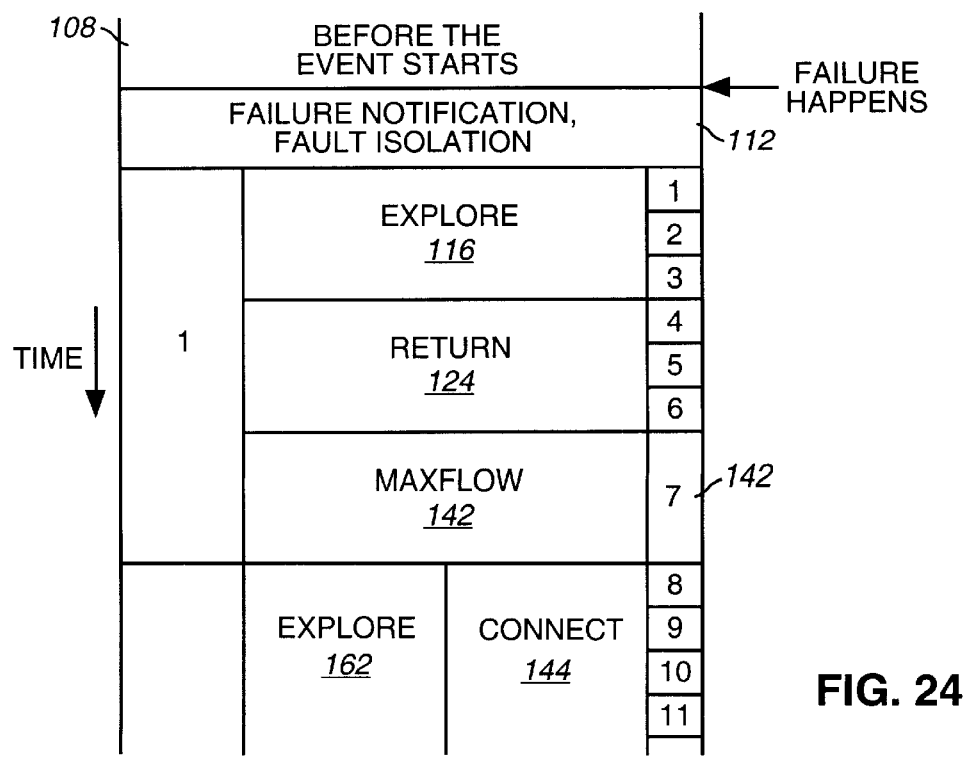
FIG. 24 provides a timed diagram for depicting the modified map derived from the return messages received at the origin node.

The next phase in the first iteration of the process of the present invention is the maxflow phase. The maxflow is a one-step phase and, as FIG. 24 depicts, for example, is the seventh step of the first iteration. All of the work in the maxflow phase for the present embodiment occurs at origin node 42. At the start of the maxflow phase, each origin node has a model of part of the network. This is the part that has been allocated to the respective origin/destination pair by the tandem nodes.

Figure 25:
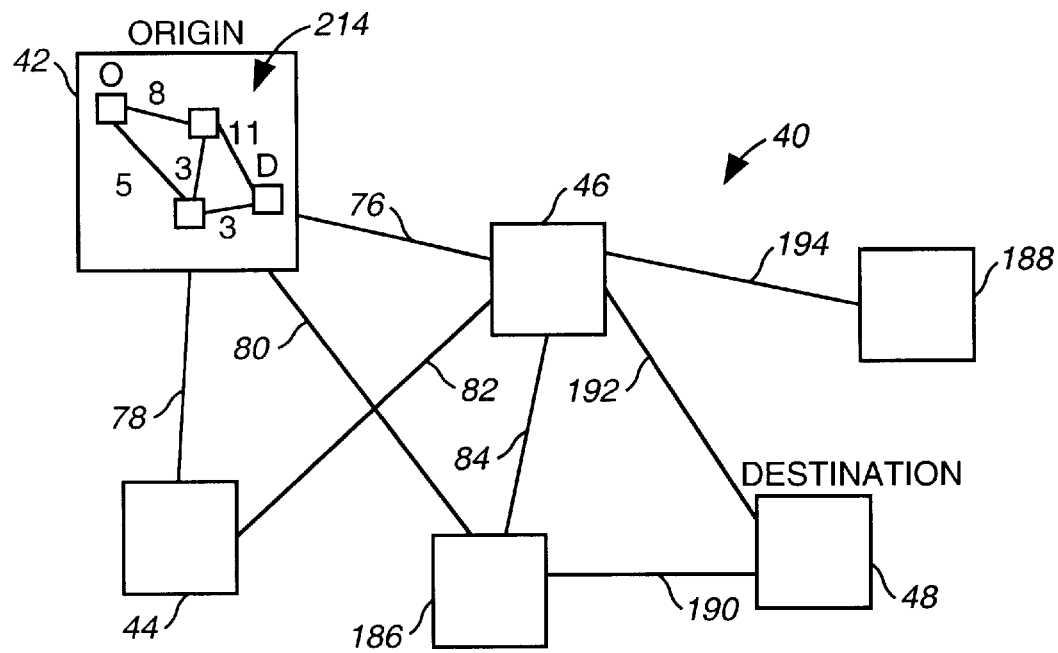
FIG. 25 illustrates an exemplary subnetwork model within an origin node in accordance with the present invention.

FIG. 25 illustrates that within origin node 42 is restoration subnetwork model 214, which shows what part of restoration subnetwork 40 has been allocated to the origin node 42-destination node 48 pair. In particular, model 214 shows that eight links have been allocated between origin node 42 and tandem node 46, and that eleven links have been allocated between tandem node 46 and destination node 48. Model 214 further shows that a possible three links may be allocated between tandem node 46 and tandem node 186.

Figure 26:
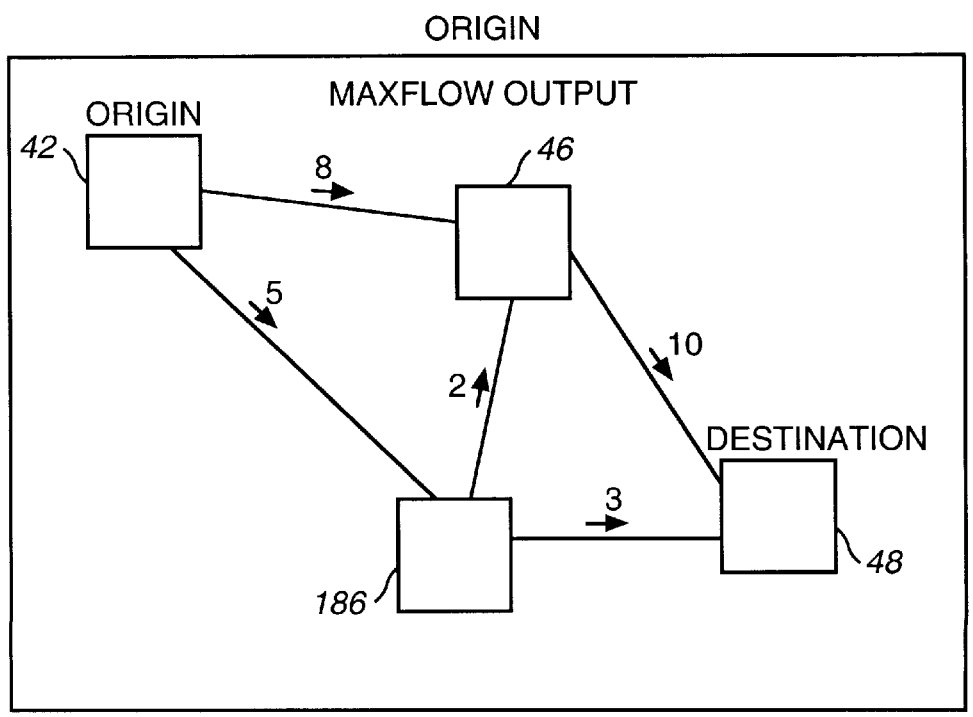
FIG. 26 shows the max flow output for the max flow phase of the present process.

As FIG. 26 depicts, therefore, in the maxflow phase 142 of the present embodiment, origin node 42 calculates alternate paths through restoration subnetwork 40. This is done using a maxflow algorithm. The maxflow output of FIG. 26, therefore, is a flow matrix indicating the desired flow of traffic between origin node 42 and destination node 48. Note that the maxflow output uses neither tandem node 44 nor tandem node 188.

Figure 27:
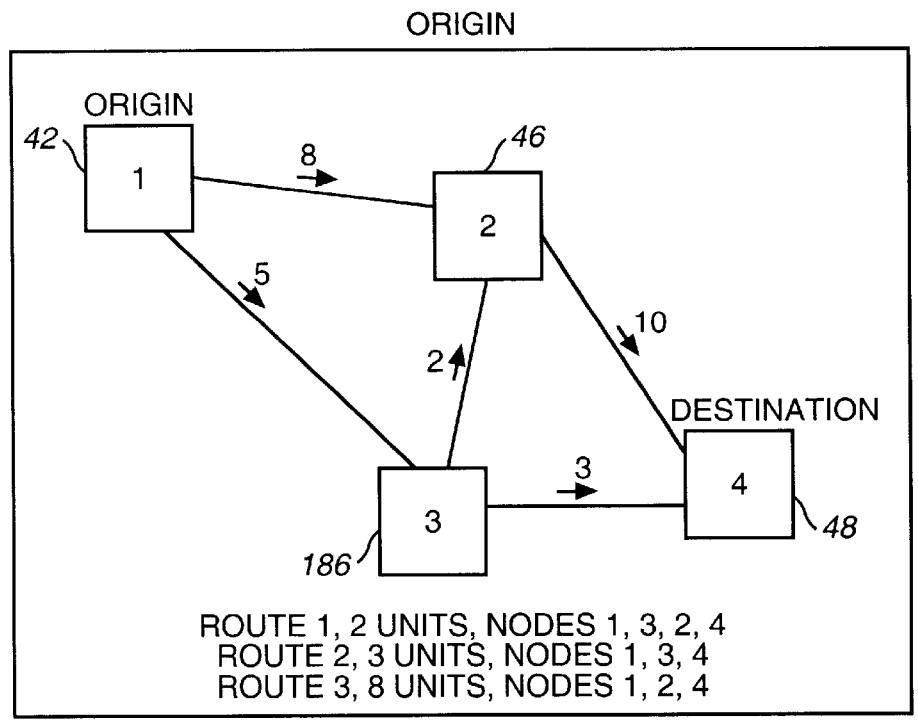
FIG. 27 illustrates an optimal routing applicable to the max flow output of the present invention.
Figure 28:
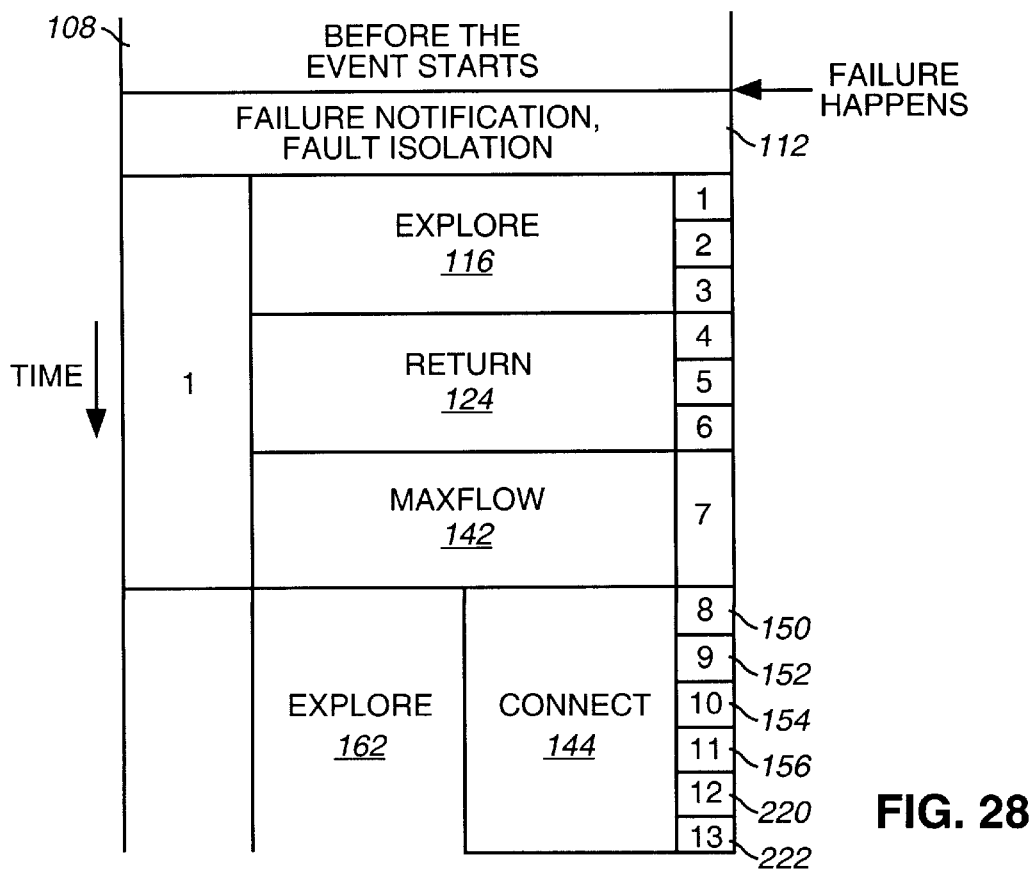
FIG. 28 provides a time diagram for showing the sequence of the connect phase for the first iteration of the process of the present invention.

FIG. 27 illustrates a breadth-first search that maxflow phase 142 uses to find routes through the maxflow phase output. In the example in FIG. 27, the first route allocates two units, first from origin node 42, then to tandem node 186, then to tandem node 46, and finally to destination node 48. A second route allocates three units, first from origin node 42 to tandem node 186, and finally to destination node 48. A third route allocates eight units, first from origin node 42 to tandem node 46. From tandem node 46, these eight units go to destination node 48.

The last phase in the first iteration in the process of the present embodiment includes connect phase 144. For the example herein described, connect phase includes steps 8 through 13 of the first iteration, here having reference numerals 150, 152, 154, 156, 220 and 222, respectively.

The connect phase is loosely synchronized, as previously described, such that each connect message moves one hop in one step. Connect phase 144 overlaps explore phase 162 of each subsequent next iteration, except in the instance of the last iteration. Connect phase 144 distributes information about what connections need to be made from, for example, origin node 42 through tandem nodes 46 and 186, to reach destination node 48.

Figure 29:
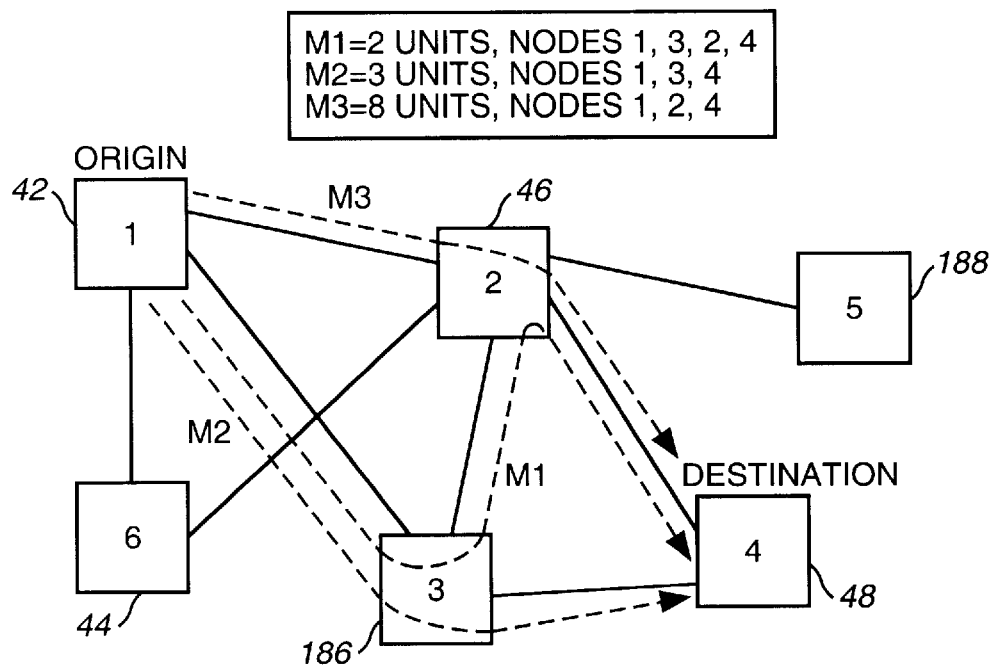
FIG. 29 illustrates the connect messages for providing the alternate path routes between an origin node and destination node of a restoration subnetwork.

In connect phase 144, messages flow along the same routes as identified during maxflow phase 142. Thus, as FIG. 29 suggests, a first message, M1, flows from origin node 42 through tandem node 186, through tandem node 46 and finally to destination node 48, indicating the connection for two units. Similarly, a second message, M2, flows from origin node 42 through tandem node 186 and then directly to destination node 48, for connecting a three-unit flow path. Finally, a third connect message, M3, emanates from origin node 42 through tandem node 46, and then the destination node 48 for allocating eight units. Connect phase 144 is synchronized so that with each step a message travels one hop.

For implementing the process of the present invention in an existing or operational network, numerous extensions are required. These extensions take into consideration the existence of hybrid networks, wherein some nodes have both SONET and DS-3 connections. Moreover, the present invention provides different priorities for working paths and different qualities for spare links. Fault isolation presents a particular challenge in operating or existing environments, that the present invention addresses.

Restricted reuse and spare links connected into paths are additional features that the present invention provides. Inhibit functions such as path-inhibit and node-inhibit are additional features to the present invention. The present invention also provides features that interface with existing restoration processes and systems, such as coordination with an existing restoration algorithm and process or similar system. To ensure the proper operation of the present invention, the present embodiment provides an exerciser function for exercising or simulating a restoration process, without making the actual connections for subnetwork restoration. Other features of the present implementation further include a drop-dead timer, and an emergency shutdown feature to control or limit restoration subnetwork malfunctions. Additionally, the present invention handles real life situations such as glass-throughs and staggered cuts that exist in communications networks. Still further features of the present embodiment include a hold-off trigger, as well as mechanisms for hop count and software revision checking, and a step timer to ensure proper operation.

Figure 30:
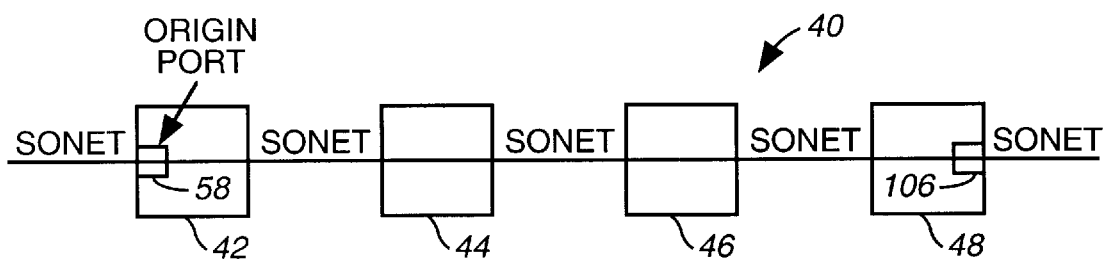
FIGS. 30 and 31 show how the present invention deals with hybrid restoration subnetworks.
Figure 31:
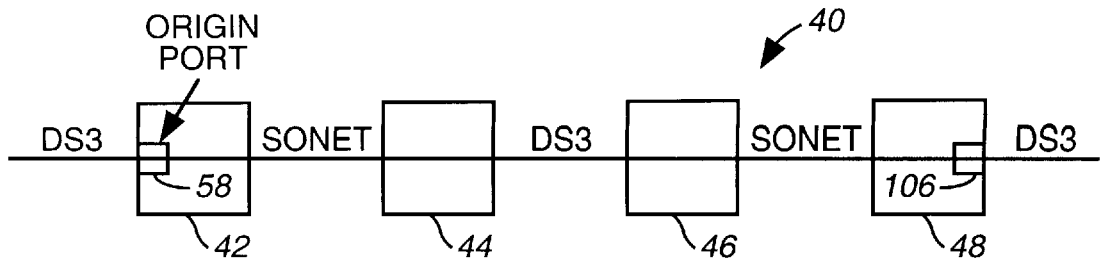

FIGS. 30 through 33 illustrate how the present embodiment addresses the hybrid networks. A hybrid network is a combination of asynchronous and SONET links. Restrictions in the way that the present invention handles hybrid networks include that all working paths must either be SONET paths with other than DS-3 loading, or DS-3 over asynchronous and SONET working paths with DS-3 access/egress (A/E) ports. Otherwise, sending path verification messages within the restoration subnetwork 40, for example, may not be practical. Referring to FIGS. 30 and 31, restoration subnetwork 40 may include SONET origin A/E port 42, that connects through SONET tandem port 44, through SONET tandem port 46 and finally to SONET destination A/E port 48. In FIG. 31, origin A/E port 42 is a DS-3 port, with tandem port 44 being a SONET node, and tandem port 46 being a DS-3 port, for example. Port 106 of destination node 48 is a DS-3 port. In a hybrid network, during the explore phase, origin node 42 requests different types of capacity. In the return phase, tandem nodes 44, 46 allocate different types of capacity.

An important aspect of connect phase 144 is properly communicating in the connect message the type of traffic that needs to be connected. This includes, as mentioned before, routing DS-3s, STS-1s, OC-3s, and OC-12Cs, for example. There is the need to keep track of all of the implementation details for the different types of traffic. For this purpose, the present invention provides different priorities of working paths and different qualities of spare links. With the present embodiment of the invention, working traffic is prioritized between high priority and low priority working traffic.

SONET traffic includes other rules to address as well. For instance, a SONET path may include an OC-3 port, which is basically three STS-1 ports, with an STS-1 representing the SONET equivalent of a DS-3 port. Thus, an OC-3 node can carry the same traffic as can three STS-1s. An OC-3 node can also carry the same traffic as three DS-3s or any combination of three STS-1 and DS-3 nodes. In addition, an OC-3 node may carry the same traffic as an STS-3. So, an OC-3 port can carry the same traffic as three DS-3, three STS-1, or one OC-3. Then, an OC-12 may carry an OC-12C. It may also carry the same traffic as up to four OC-3 ports, up to 12 STS-1 ports, or up to twelve DS-3 ports. With all of the possible combinations, it is important to make sure that the large capacity channels flow through the greatest capacity at first.

An important aspect of the present invention, therefore, is its ability to service hybrid networks. A hybrid network is a network that includes both SONET and asynchronous links, such as DS-3 links. The present invention provides restoration of restoration subnetwork 40 that may include both types of links. The SONET standard provides that SONET traffic is backward compatible to DS-3 traffic. Thus, a SONET link may include a DS-3 signal inside it. A restoration subnetwork that includes both SONET and DS-3 can flow DS-3 signals, provided that both the origin A/E port 42 and the destination A/E port 48 are DS-3 ports. If this were not the case, there would be no way to send path verification messages. 104 within restoration subnetwork 40.

As with pure networks, with hybrid networks, explore messages request capacity for network restoration. These messages specify what kind of capacity that is necessary. It is important to determine whether DS-3 capacity or SONET capacity is needed. Moreover, because there are different types of SONET links, there is the need to identify the different types of format of SONET that are needed. In the return phase, tandem nodes allocate capacity to origin-destination pairs. Accordingly, they must be aware of the type of spares that are available in the span. There are DS-3 spares and SONET spares. Capacity may be allocated knowing which type of spares are available. There is the need, therefore, in performing the explore and return phases, to add extensions that allow for different kinds of capacity. The explore message of the present invention, therefore, contains a request for capacity and decides how many DS-3s and how many SONET links are necessary. There could be the need for an STS-1, an STS-3C, or an STS-12C, for example. Moreover, in the return phase it is necessary to include in the return message the information that there is more than one kind of capacity in the network. When traffic routes through the network it must be aware of these rules. For instance, a DS-3 failed working link can be carried by a SONET link, but not vice versa. In other words, a DS-3 cannot carry a SONET failed working path.

FIGS. 32 and 33 illustrate this feature. For example, referring to FIG. 32, origin node 42 may generate explore message to tandem node 44 requesting five DS-3s, three STS-1s, two STS-3(c)s, and one STS-12(c)s. As FIG. 33 depicts, from the return phase, origin node 42 receives return message from tandem node 44, informing origin node 42 that it received five DS-3s, one STS-1, one STS-3(c), and no STS-12s.

For a hybrid restoration subnetwork 40, and in the max-flow phase, the present invention first routes OC-12C failed working capacity over OC-12 spare links. Then, the max flow phase routes OC-3C, failed working capacity, over OC-12 and OC-3 spare links. Next, the present embodiment routes STS-1 failed working links over OC-12, OC-3 and STS-1 spare links. Finally, the max flow phase routes DS-3 failed working links over OC-12, OC-3, STS-1, and DS-3 spare links. In the connect phase, the restoration subnetwork of the present invention responds to the hybrid network in a manner so that tandem nodes get instructions to cross-connect more than one kind of traffic.

FIG. 34 relates to the property of the present invention of assigning different priorities for working paths, and different qualities for spare links. The present embodiment of the invention includes 32 levels of priority for working paths; priority configurations occur at origin node 42, for example. Moreover, the preferred embodiment provides four levels of quality for spare links, such as the following. A SONET 1:N protected spare link on a span that has no failed links has the highest quality. The next highest quality is a SONET 1:N protect port on a span that has no failed links. The next highest quality is a SONET 1:N protected port on the span that has a failed link. The lowest quality is a SONET 1:N protect port on a span that has a failed link.

With this configuration, different priorities relate to working paths, and different qualities for spare links. At some stages of employing the present process, the feature of priority working paths and different quality spare links for some uses of the present process, it is possible to simplify the different levels of priority and different levels of quality into simply high and low. For example, high priority working links may be those having priorities 1 through 16, while low priority working links are those having priorities 17 through 32. High quality spares may be, for example, quality 1 spares, low quality spares may be those having qualities 2 through 4.

With the varying priority and quality assignments, the present invention may provide a method for restoring traffic through the restoration subnetwork. For example, the present invention may first try to restore high priority failed working links on high-quality spare links, and do this as fast as possible. Next, restoring high-quality failed working links on low-quality spares may occur. Restoring low-priority failed working paths on low-quality spare links occurs next. Finally, restoring low priority failed working paths on high quality spare links is performed.

To achieve this functionality, the present invention adds an extra iteration at the end of normal iterations. The extra iteration has the same number of steps as the iteration before it. Its function, however, is to address the priorities for working paths and qualities for spare links. Referring to FIG. 34, during normal iterations, the present invention will restore high priority working paths over high-quality spare links. During the extra iteration, as the invention restores high-priority working paths over low-quality spare links, then low-priority working paths over low-quality spare links, and finally low-priority working paths over high-quality spare links. This involves running the max flow algorithm additional times.

The network restoration process of the present invention, including the explore, return, and connect messaging phases may be repeated more than once in response to a single failure episode with progressively greater hop count limits. The first set of iterations are confined in restoring only high priority traffic. Subsequent or extra iterations may be used seek to restore whatever remains of lesser priority traffic. This approach give high priority traffic a preference in terms of path length.

Figure 36:
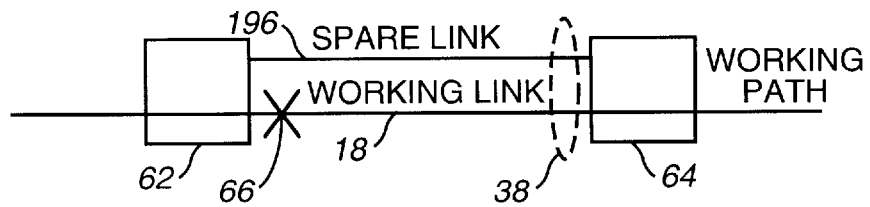
Figure 37:
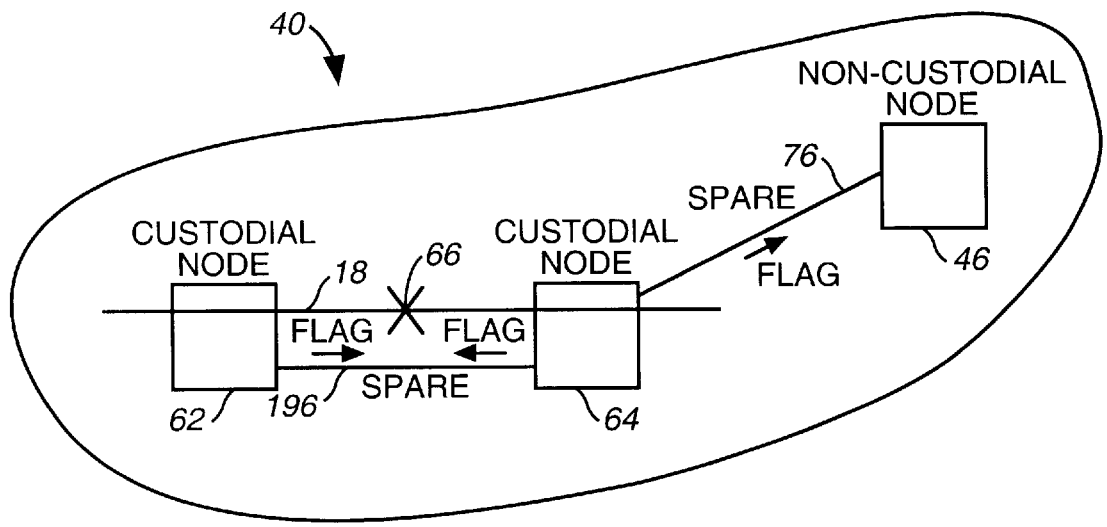
FIG. 37 illustrate the use of a "I am custodial node" flag of the present invention.

FIGS. 35–37 provide illustrations for describing in more detail how the present invention handles fault isolation. Referring to FIG. 35, between tandem notes 44 and 46 appears spare link 92. Between custodial nodes 62 and 64 are working link 18 having failure 66 and spare link 196. If a spare link, such as spare link 196, is on a span, such as span 38 that has a failed working link, that spare link has a lower quality than does a spare link, such as spare link 92 on a span that has no failed links. In FIG. 35, spare link 92 between tandem notes 46 and 48 is part of a span that includes no failed link. In this example, therefore, spare link 92 has a higher quality than does spare link 196.

Within each node, a particular order is prescribed for sorting lists of spare ports and lists of paths to restore. This accomplishes both consistent mapping and preferential assignment of highest priority to highest quality restoration paths. Specifically, spare ports are sorted first by type (i.e., bandwidth for STS-12, STS-3, then by quality and thirdly by port label numbers. Paths to be restored are sorted primarily by type and secondarily by an assigned priority value. This quality of a given restoration path is limited by the lowest quality link along the path.

In addition to these sorting orders, a process is performed upon these lists in multiple passes to assign traffic to spare ports while making best use of high capacity, high-quality resources. This includes, for example, stuffing high priority STS-1's onto any STS-12's that are left after all other STS-12 and STS-3 traffic has been assigned.

Rules determine the proper way of handling different priorities of working paths and different qualities of spares in performing the restoration process. In our embodiment of the invention, there may be, for example, 32 priority levels. The working traffic priority may depend on business-related issues, such as who is the customer, how much money did the customer pay for communications service, what is the nature of the traffic. Higher priority working channels are more expensive than are lower priority channels. For example, working are assigned priorities according to these types of considerations. Predetermined configuration information of this type may be stored in the origin node of the restoration subnetwork. Thus, for every path in the origin node priority information is stored. Although functionally there is no difference between a high priority working path and lower priority working path, higher priority working paths will have their traffic restored first and lower priority working paths will be restored later.

The present embodiment includes four qualities of spare links. Spare link quality has to do with two factors. A link may either be protected or nonprotected by other protection schemes. In light of the priorities of failed working paths and the quality of spare links, the present invention uses certain rules. The first rule is to attempt to restore the higher priority failed working paths on the highest quality spare links. The next rule is to restore high quality failed working paths on both high quality and low quality spares. The third rule is to restore low priority failed working paths on low quality spares. The last thing to do is to restore low priority working paths over high and low quality spares.

The present invention also makes it possible for a node to know when it is a custodial node. Because there are no keep-alive messages on working links, however, the custodial node does not know on what span the failed link resides. Thus, referring to FIG. 36, custodial node 64 knows that custodial node 62 is on the other end of spare link 196. The difficulty arises, however, in the ability for custodial nodes 62 and 64 to know that working link 18 having failure 66 and spare link 196 are on the same span, because neither custodial node 62 nor custodial node 64 knows on what span is working link 18.

FIG. 37 illustrates how the present embodiment overcomes this limitation. Custodial node 64, for example, sends a "I am custodial node" flag in the keep-alive messages that it sends on spare links, such as to non-custodial tandem node 46. Also, custodial node 64 and custodial node 62 both send "I am custodial node" flags on spare 196, to each other. In the event that the receiving non-custodial node, such as tandem node 46, is not itself a custodial node, then it may ignore the "I am custodial node" flag. Otherwise, the receiving node determines that the failure is on the link between itself and the custodial node from which the receiving custodial node receives the "I am custodial node" flag.

There may be some limitations associated with this procedure, such as it may be fooled by "glass throughs" or spans that have no spares. However, the worst thing that could happen is that alternate path traffic may be placed on a span that has a failed link, i.e., a lower quality spare.

The present embodiment provides this functionality by the use of an "I am custodial node" flag that "piggybacks" on the keep alive message. Recalling that a custodial node is a node on either side of a failed link, when the custodial node is identified, the "I am custodial node" flag is set. If the flag appears on a spare link, that means that the neighboring link is the custodial node. This means that the node is adjacent to a failure. If the node receiving the flag is also a custodial node, then the spare is on the span that contains the failed link. So, the custodial node that is sending the flag to the non-custodial node, but not getting it back from a non-custodial node a flag, this means that the spare link is not in a failed span.

Figure 38:
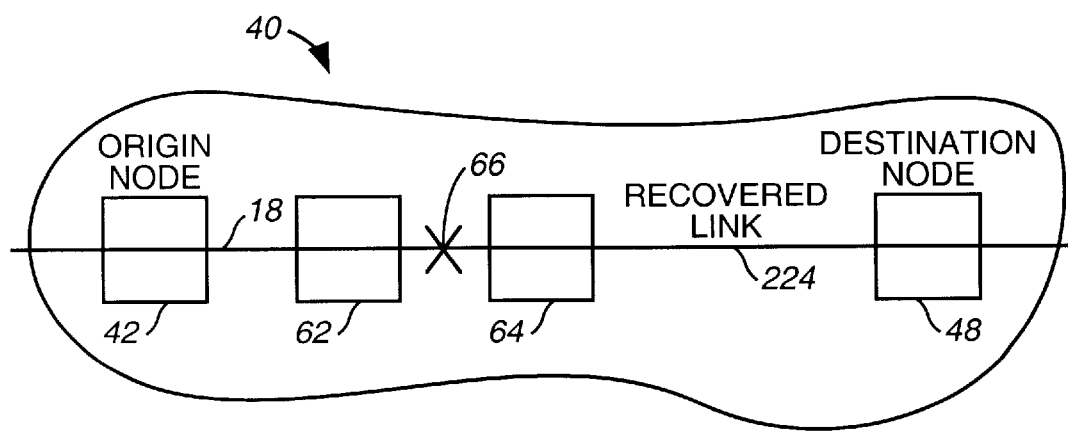
FIGS. 38 through 42 describe the restricted reuse features of the present invention.

FIGS. 38–42 illustrate the restricted re-use feature of the present invention. The present invention also includes a restricted re-use function. A recovered link relates to the feature of restricted re-use. Given a path with a failure in it, a recovered link may exist between two nodes. The recovered link is a good link but is on a path that has failed. FIG. 38 shows restoration subnetwork 40 that includes origin node 42 on link 18 and through custodial nodes 62 and 64 connects to destination node 48. Failure 66 exists between custodial nodes 62 and 64. The restricted re-use feature of the present invention involves what occurs with recovered links, such as recovered link 224.

There are at least three possible modes of re-use. One mode of re-use is simply no re-use. This prevents the use of recovered links to carry alternate path traffic. Another possible re-use mode is unrestricted re-use, which permits recovery links to carry alternate path traffic in any possible way. Still another re-use mode, and one that the present embodiment provides, is restricted re-use. Restricted re-use permits use of recovered links to carry alternate path traffic, but only the traffic they carry before the failure.

Figure 39:
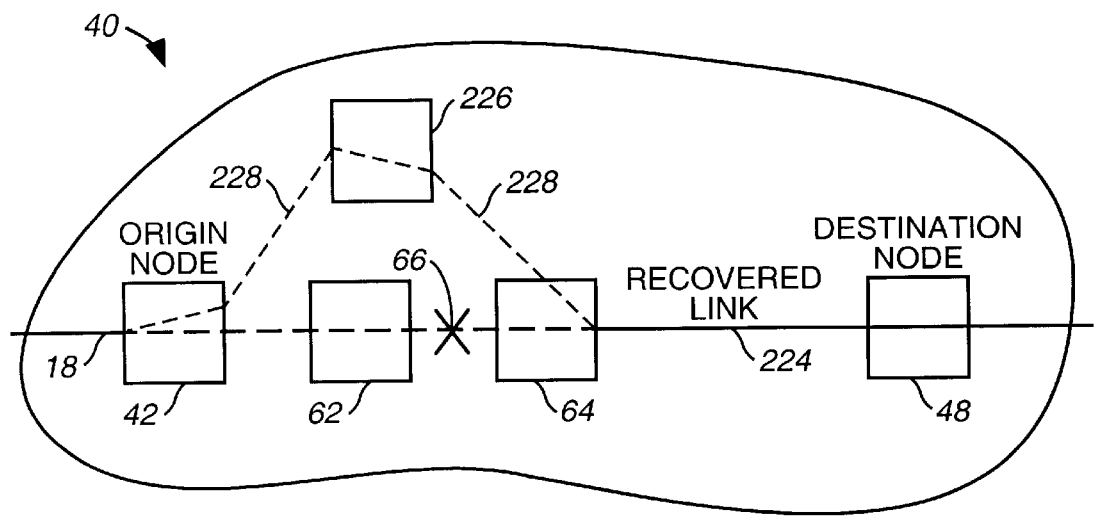

FIG. 39 illustrates the restricted re-use concept that the present invention employs. Link 18 enters origin node 42 and continues through tandem node 226 on link 228 and 230 through custodial node 64 through recovered link 224 to destination node 48.

Restricted re-use includes modifications to the explore and return phases of the present invention wherein the process determines where recovered links are in the network. The process finds the recovered links and sends this information to the origin node. The origin node collects information about where the recovered links are in the network to develop a map of the recovered links in the restoration subnetwork. The tandem nodes send information directly to the origin node via the wide are network about where the re-use links are.

Figure 40:
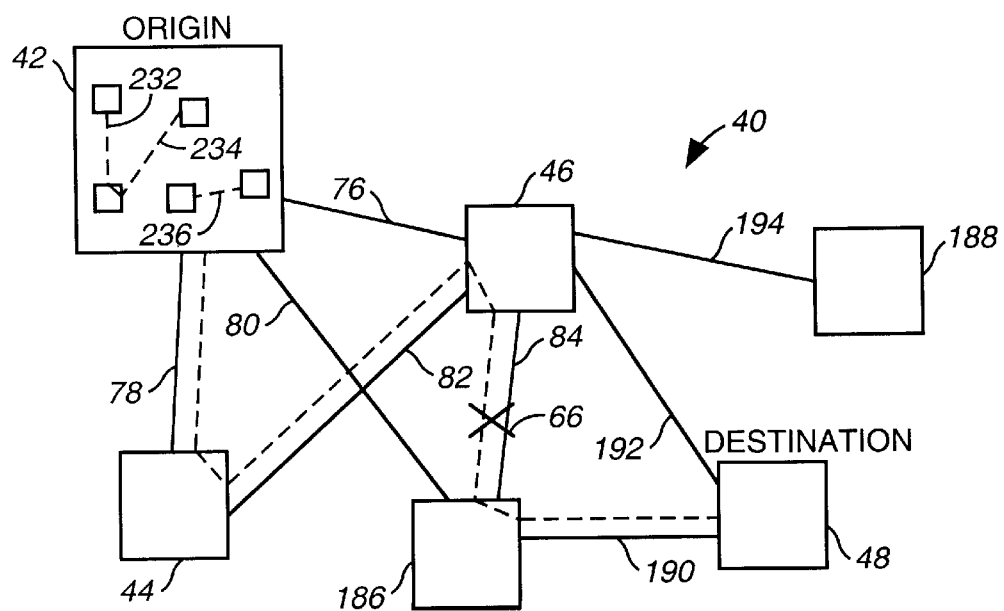
Figure 41:
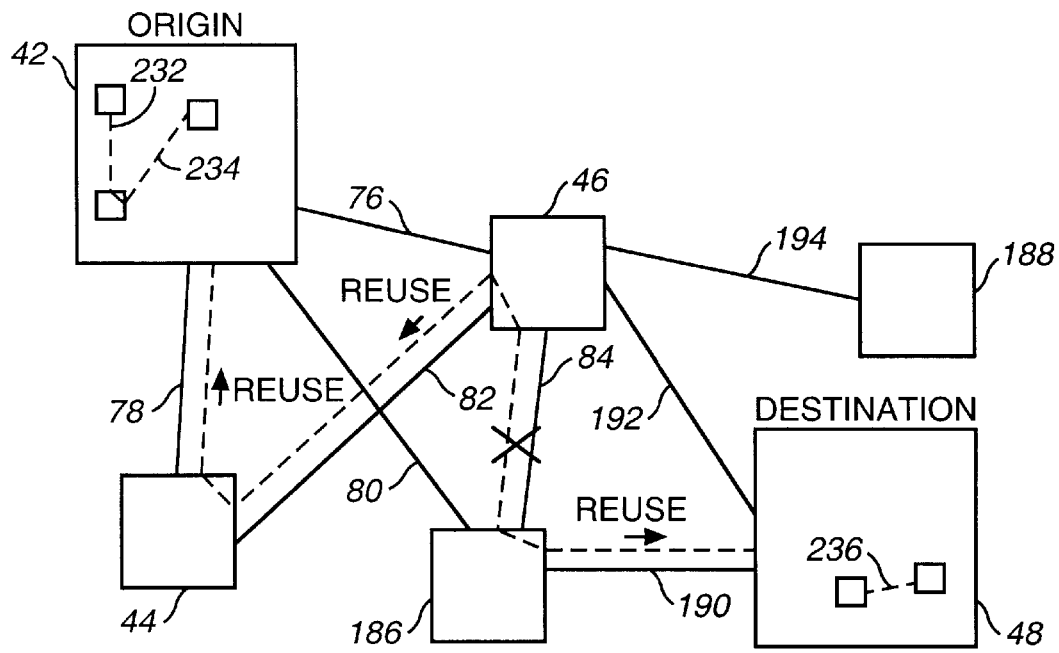
Figure 42:
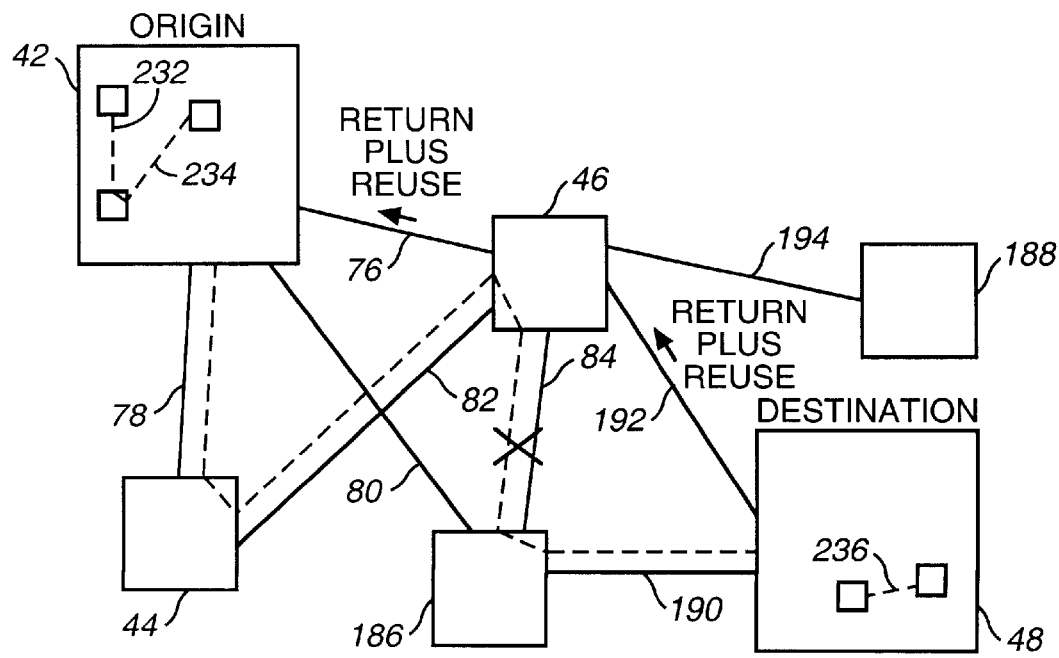

FIGS. 40 through 42 illustrate how the present embodiment achieves restricted re-use. Referring to restoration subnetwork portion 40 in FIG. 40, origin node 42 connects through tandem node 44 via link 78, to tandem node 46 via link 82, to tandem node 186 via link 84, and to destination node 48 via link 190. Note that between tandem node 46 and tandem node 186 appears failure 66.

To implement restricted re-use in the present embodiment, during the explore and return phases the origin node 42 will acquire a map of recovered links. Thus, as FIG. 40 shows within origin node 42, recovered links 232, 234, and 236 are stored in origin node 42. This map is created by sending in-band messages, re-use messages, during the explore phase, along recovered links from the custodial nodes to the origin and destination nodes, such as origin node 42 and destination node 48. Thus, as FIG. 41 illustrates, in the explore phase, reuse messages emanate from tandem node 46 to tandem node 44 and from there to origin node 42. From tandem node 186, the reuse message goes to destination node 48.

In the return phase, such as FIG. 42 depicts, the destination node sends the information that it has acquired through re-use messages to the origin node by piggybacking it on return messages. Thus, as shown in FIG. 42, designation node 48 sends on link 192 a return plus re-use message to tandem node 46. In response, tandem node 46 sends a return plus re-use message on link 76 to origin node 42.

With the restricted re-use feature and in the max flow phase, origin node 42 knows about recovered links and "pure" spare links. When the origin node runs the max flow algorithm, the recovered links are taken into consideration with the pure spare links. When the breadth-first-search is performed, the present invention does not mix recovered links from different failed working paths on the same alternate path.

Another feature of the present invention relates to spare links connected into paths. In the event of spare links being connected into paths, often these paths may have idle signals on them or a test signal.

If a spare link has a test signal on it, it is not possible to distinguish it from a working path. In this instance, the present invention avoids using spare links with "working" signals on them (a period at end of sentence).

In the max flow phase, the origin has discovered what may be thought of as pure spare link. The origin node also receives information about recovered links, which the present invention limits to restricted re-use. In running the max flow algorithm during the max flow phase of the present process, the pure spare and recovered links are used to generate a restoration map of the restoration subnetwork first, irrespective of whether the links are pure, spare or recovered.

Figure 43:
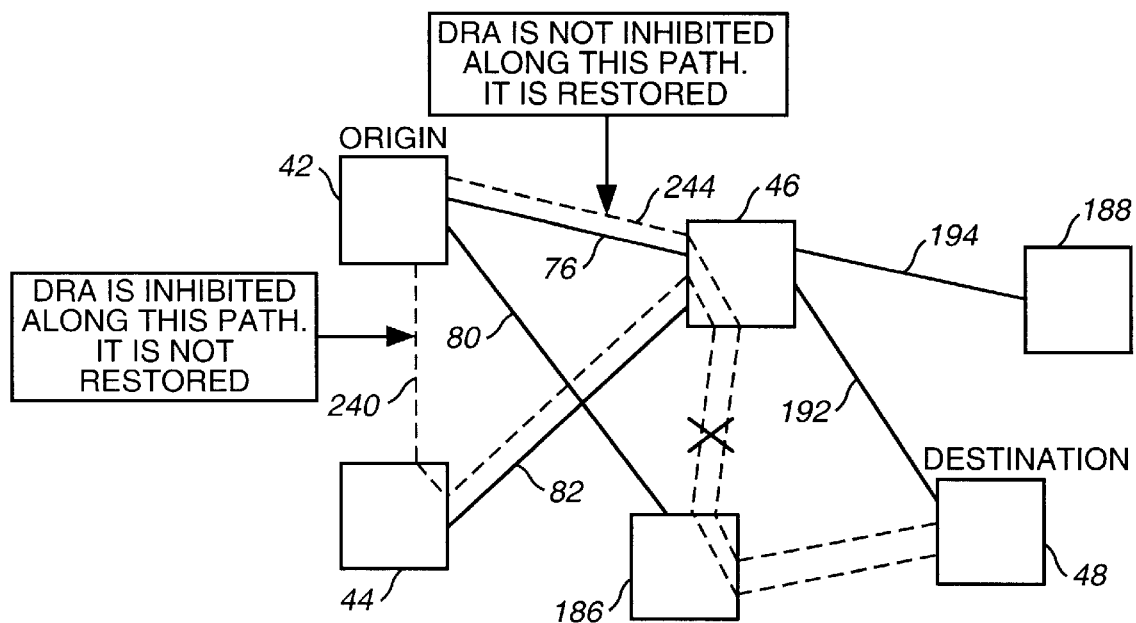
FIG. 43 describes the path inhibit feature of the present invention.
Figure 44:
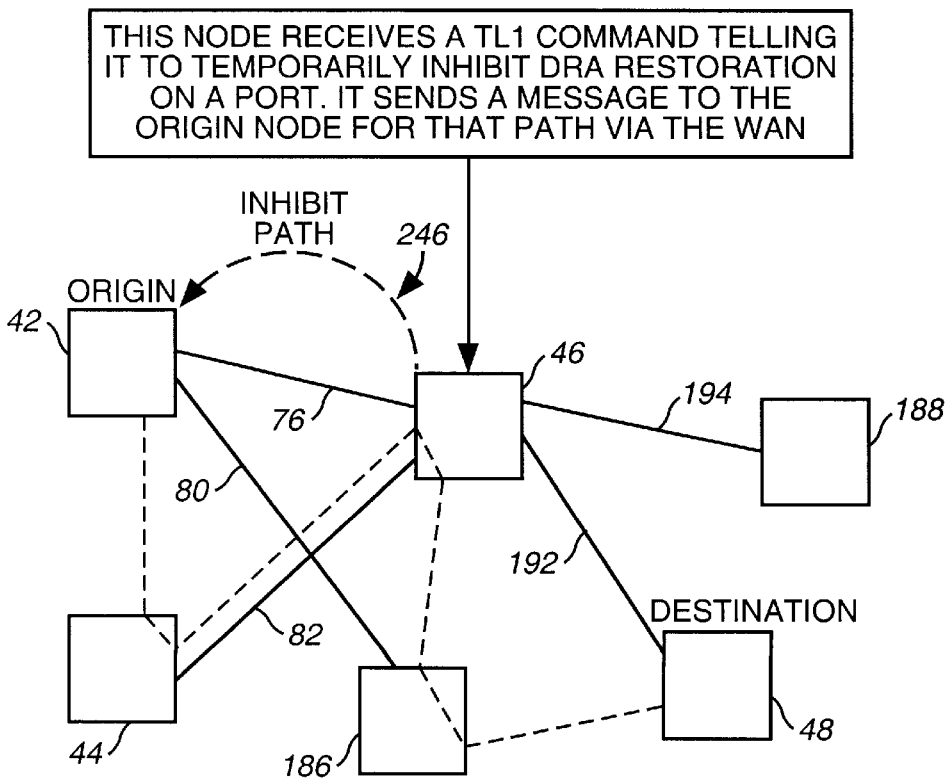
FIG. 44 further describes the path inhibit feature of the present invention.

Another aspect of the present invention is the path inhibit function. FIGS. 43 and 44 illustrate the path inhibit features of the present invention. For a variety of reasons, it may be desirable to temporarily disable network restoration protection for a single port on a given node. It may be desirable, later, to turn restoration protection back on again without turning off the entire node. All that is desired, is to turn off one port and then be able to turn it back on again. This may be desirable when maintenance to a particular port is desired. When such maintenance occurs, it is desirable not to have the restoration process of the present invention automatically initiate. The present invention provides a way to turn off subnetwork restoration on a particular port. Thus, as FIG. 43 shows, origin node 42 includes path 240 to tandem node 44. Note that no spare link appears between node 42 and 44. This signifies that the restoration process of the present invention is inhibited along path 240 along origin node 42 and tandem node 44. Working path 244, on the other hand, exist between origin node 42 and tandem node 46. Link 76 indicates that the rest-oration process of the present invention is noninhibited along this path if it is subsequently restored.

During the path inhibit function, the process of the present invention inhibits restoration on a path by blocking the restoration process at the beginning of the explore phase. The origin node either does not send out an explore message at all or sends out an explore message that does not request capacity to restore the inhibited path. This is an instruction that goes to the origin node. Thus, during path inhibit, the process of the present invention is to inform origin node 42, for example, to inhibit restoration on a path by sending it a message via the associated wide area network communicably linking all of the nodes.

Referring to FIG. 44, therefore, tandem node 46 sends a path inhibit message to origin node 42. Tandem node 46 receives, for example, a TL1 command telling it to temporarily inhibit the restoration process on a port. It sends a message to origin node 42 for that path via wide area network as arrow 246 depicts.

Tandem node 46 sends inhibit path message 246 with knowledge of the Internet protocol address of its source node. The IP address is received as part of the path verification message. There may be some protocol involved in performing this function. This purpose would be to cover the situation wherein one node fails while the path is inhibited.

Another feature of the present invention is that it permits the inhibiting of a node. With the node inhibit function, it is possible to temporarily inhibit the restoration process of the present invention on a given node. This may be done, for example, by a TL1 command. A node continues to send its step-complete messages in this condition. Moreover, the exerciser function operates with the node in this condition.

To support the traditional field engineering use of node port test access and path loopback capabilities, the restoration process must be locally disabled so that any test signals and alarm conditions may be asserted without triggering restoration processing. According to this technique as applied to a given path, a port that is commanded into a test access, loopback, or DRA-disabled mode shall notify the origin node of the path to suppress DRA protection along the path. Additional provisions include automatic timeout of the disabled mode and automatic loopback detection/restoration algorithm suppression when a port receives an inband signal bearing its own local node ID which signifies far-end loopback.

Direct node-node communications are accomplished through a dedicated Wide Area Network. This approach bypasses the use of existing in-band and out-of-band call processing signaling and network control links for a significant advantage in speed and simplicity. In addition, the WAN approach offers robustness by diversity.

A triggering mechanism for distributed restoration process applies a validation timer to each of a collection of alarm inputs, keeps a count of the number of validated alarms at any point in time, and generates a trigger output whenever the count exceeds a preset threshold value. This approach reduces false or premature DRA triggering and gives automatic protect switching a chance to restore individual link failures. It also allows for localizing tuning of trigger sensitivity based on quantity and coincidence of multiple alarms.

The preferred embodiment provides a step Completion Timer in Synchronous DRA. For each DRA process initiated within a network node, logic is provided for automatically terminating the local DRA process whenever step completion messages are not received within a certain period of time as monitored by a failsafe timer. Other causes for ending the DRA process in a node are loss of keep alive signals through an internode WAN link, normal completion of final DRA iteration, consumption of all available spare ports, or an operation support system override command.

Another aspect of the present invention is a method for handling staggered failure events in DRA. In a protected subnetwork, an initial link failure, or a set of nearly simultaneous failures, trigger a sequence of DRA processing phases involving message flow through the network. Other cuts that occur during messaging may similarly start restoration processing and create confusion and unmanageable contentions for spare resources. The present technique offers an improvement over known methods. In particular, during explore and return messaging phases, any subsequent cuts that occur are "queued" until the next Explore phase. Furthermore, in a multiple iteration approach, Explore messaging for new cuts is withheld while a final Explore/Return/Connect iteration occurs in response to a previous cut. These late-breaking held over cuts effectively result in a new, separate invocation of the DRA process.

The present invention includes failure notification messages that include information about the software revision and hop count table contents that are presumed to be equivalent among all nodes. Any nodes that receive such messages and find that the local software revision or hop count table contents disagree with those of the incoming failure notification message shall render themselves ineligible to perform further DRA processing. However, a node that notices a mismatch and disable DPA locally will still continue to propagate subsequent failure notification messages.

The present invention provides a way to audit restoration process data within nodes that include asserting and verifying the contents of data tables within all of the nodes in a restoration-protected network. In particular, such data may contain provisioned values such as node id, WAN addresses, hop count sequence table, and defect threshold. The method includes having the operations support system which supervises all of the nodes in the network disable the restoration process nodes, write and verify provisionable data contents at each node, then re-enabling the restoration process when all nodes have correct data tables.

In a data transport network that uses a distributed restoration approach, a failure simulation can be executed within the network without disrupting normal traffic. This process includes an initial broadcast of a description of the failure scenario, modified DRA messages that indicate they are "exercise only" messages, and logic within the nodes that allows the exercise to be aborted if a real failure event occurs during the simulation.

Another aspect of the present invention is the ability to coordinate with other restoration processes such as, for example, the RTR restoration system. With the present invention, this becomes a challenge because the port that is protected by the restoration process of the present invention is often also protected by other network restoration algorithms.

Another aspect of the present invention is the exerciser function. The exerciser function for the restoration process of the present invention has two purposes. One is a double check to make sure that the restoration process is operating properly. The other is an exercise for capacity planning to determine what the restoration process would do in the event of a given link failure scenario. With the present invention, the exerciser function operates the same software as does the restoration process during subnetwork restoration, but with one exception. During the exerciser function, connections are not made. Thus, when it comes time to make a connection, the connection is just not made.

With the exerciser function, essentially the same reports occur as would occur in the event of a link failure.

Unfortunately, because of restrictions to inband signaling, there are some messages that may not be exchanged during exercise that would be exchanged during a real event. For that reason, during the exercise function it is necessary to provide the information that is in these untransmittable messages. This permits the desired exerciser function.

Another aspect of the present invention is a drop-dead timer and emergency shut down. The drop-dead timer and emergency shut down protect against bugs or defects in the software. If the restoration process of the present invention malfunctions due to a software problem, and the execution of the DRA awry, it is necessary to reset the restoration processes in the restoration subnetwork. The dropdead timer and emergency shut down provide these features. The drop-dead timer is actuated in the event that a certain maximum allowed amount of execution time in the restoration process is exceeded. By establishing a maximum operational time the restoration network can operate for 30 seconds, for example, but no more. When 30 seconds elapse after the initiation of the DRA process, the restoration process turns off.

An emergency shut down is similar to a drop-dead timer, but is manually initiated. For example, with the present invention, it is possible to enter a TL1 command to shut down the restoration process. The emergency shut down feature, therefore, provides another degree of protection to compliment the drop-dead timer.

Out-of-band signaling permits messages to be delivered over any communication channel that is available. For this purpose, the present invention uses a restoration process wide area network. For purposes of the present invention, several messages get sent out of band. These include the explore message, the return message, the connect message, the step complete message, as well as a message known as the exercise message which has to do with an exerciser feature of the present invention. The wide area network of the present invention operates under the TCP/IP protocol, but other protocols and other wide area networks may be employed. In order to use the wide area network in practicing the present invention, there is the need to obtain access to the network. For the present invention, access to the wide area network is through two local area network Ethernet ports. The two Ethernet ports permit communication with the wide area network. In the present embodiment of the invention, the Ethernet is half duplex, in the sense that the restoration subnetwork sends data in one direction on one Ethernet while information flows to the restoration subnetwork in the other direction on the other Ethernet port. The wide area network of the present invention includes a backbone which provides the high bandwidth portion of the wide area network. The backbone includes the same network that the restoration subnetwork protects. Thus, the failure in the restoration subnetwork could potentially cut the wide area network.

Accordingly, there may be more attractive wide area networks to use with the present invention. For example, it may be possible to use spare capacity as the wide area network. In other words, there may be spare capacity in the network which could be used to build the wide area network itself. This may provide the necessary signal flows to the above-mentioned types of messages. With the present invention, making connections through the wide area network is done automatically.

For the cross-connect switches of the present invention, there is a control system that includes a number of computers within the cross-connect switch. The cross-connect switch may include possibly hundreds of computers. These computers connect in the hierarchy in three levels in the present embodiment. The computers that perform processor-intensive operations appear at the bottom layer or layer 3. Another layer of computers may control, for example, a shelf of cards. These computers occupy layer 2. The layer 1 computers control the layer 2 computers.

The computers at layer 1 perform the instructions of the restoration process of the present invention. This computer may be centralized in the specific shelf where all layer 1 computers are in one place together with the computer executing the restoration process instructions. Because the computer performing the restoration process of the present invention is a layer 1 computer, it is not possible for the computer itself to send in-band messages. If there is the desire to send an in-band message, that message is sent via a layer 3 computer. This is because the layer 3 computer controls the local card that includes the cable to which the local card connects. Accordingly, in-band messages are generally sent and received by layer 2 and/or layer 3 computers, and are not sent by layer 1 computers, such as the one operating the restoration instructions for the process of the present invention.

Fault isolation also occurs at layer 2 and layer 3 computers within the cross-connects. This is because fault isolation involves changing the signals in the optical fibers. This must be done by machines at lower layers. Moreover, a port, which could be a DS-3 port or a SONET port, has a state in the lower layer processors keep track of the port state. In essence, therefore, there is a division of labor between layer 2 and 3 computers and the layer 1 computer performing the instructions for the restoration process of the present invention.

Figure 45:
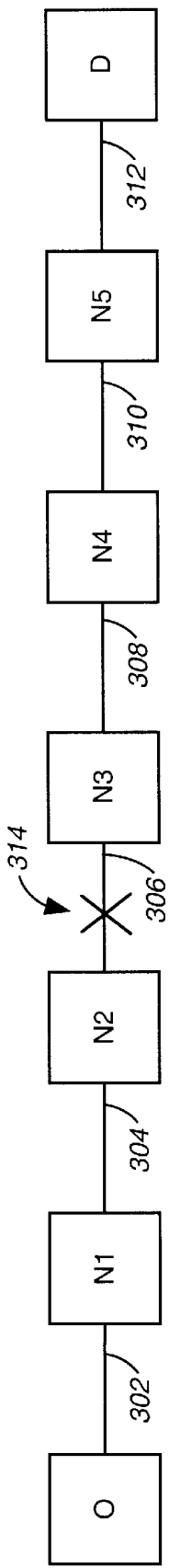
FIG. 45 is a path of a telecommunications network for illustrating the instant invention.

With reference to FIG. 45, an end to end path in a telecommunications network provisioned with a distributed restoration algorithm is shown to include an origin node and a destination node, represented by 0 and D, respectively. Interconnecting the origin node and destination node are a number of nodes, for example the intermediate nodes N1-N5. Each of these nodes in fact is a digital cross-connect switch such as the 1633-SX switch made by the Alcatel Company. Each of these switches has a number of ports to which are connected a number of links for interconnecting each switch to other switches of the network. For ease of explanation and illustration, as shown in FIG. 45, each adjacent pair of nodes is connected by a span or link such as 302, 304, 306, 308, 310 and 312. As is well known, each span can have a number of links and each adjacent pair of nodes may in fact have a number of interconnected spans. Also for ease of discussion, no other nodes of the telecommunications network are shown to be connected to the path of FIG. 45.

As illustrated in FIG. 45, a fault has occurred in span 306. Such fault may be for example a cut in which one or more links of the span have been cut, or in the worst case scenario, the whole span has been cut. As is well known, when a fault occurs, the nodes bracketing or sandwiching the fault 314 are the first nodes to receive an alarm signal, which then is propagated by those nodes to nodes downstream thereof. Thus, as soon as fault 314 occurs at span 306, custodial nodes N2 and N3 each receive an alarm. Nodes N2 and N3 would in turn propagate the received alarm to nodes downstream thereof such as for example nodes N1 and the origin node for custodial node N2, and nodes N4, N5 and the destination node for custodial node N3.

With fault 314 at span 306, the communicative path of FIG. 45 becomes non-functioning. This is despite the fact that there is only one fault, namely fault 314 for the whole path. Putting it differently, there is only one span, namely span 306, that has malfunctioned. Yet data from the origin node can no longer be routed to the destination node in the path shown in FIG. 1. This is so in spite of the fact that span or links 302, 304, 308, 310 and 312 each remain operational.

The main objective of the present invention, as noted above, is to be able to utilize the functioning spans or links of a failed path so that there may be a better utilization of the available resources of the telecommunications network.

To achieve this end, the network of the instant invention is provisioned with the ability, in its distributed restoration algorithm, for the custodial nodes of a fault to send out a message that informs nodes downstream thereof of any portions of the failed path that remain intact and functional.

Figure 46:
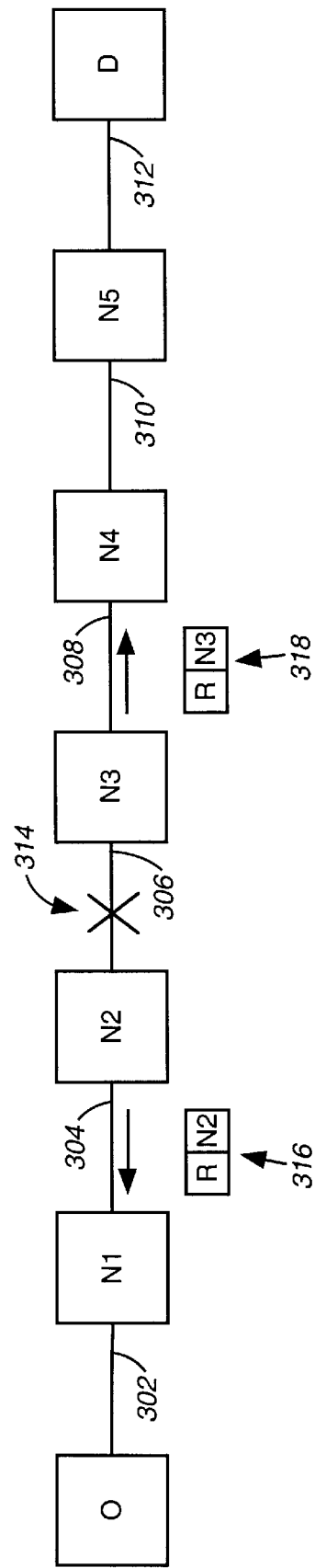
FIG. 46 illustrates the messages that are sent from the custodial nodes of the failed path of FIG. 1.

The first step of the inventive scheme is illustrated in FIG. 46. As shown, a "reuse" message is sent from each of nodes N2 and N3 to their respective adjacent nodes N1 and N4. The reuse message propagated from N2 is designated 316 while the reuse message propagated from N3 is designated 318. Each of those messages in turn is similar to the messages disclosed in copending application serial number 09/152,224 entitled Signal Conversion For Fault Isolation, the disclosure of which is being incorporated by reference hereto. In particular, as shown in FIG. 49, the reuse message is shown to include an identifier field 320 to which an identifier, represented by R, has been added to designate the message as being a reuse message. The message of FIG. 49 further includes a variable length route information field 322 to which the identification ID for each node can be added. Other fields of the FIG. 49 message not germane to the discussion of the instant invention are left blank and are not shown in the messages shown in FIGS. 46–48.

Returning to FIG. 46, it can be seen that reuse message 316 has in its route information field the node ID of node N2. On the other hand, reuse message 318 has in its route information field the node ID of node N3.

Figure 47:
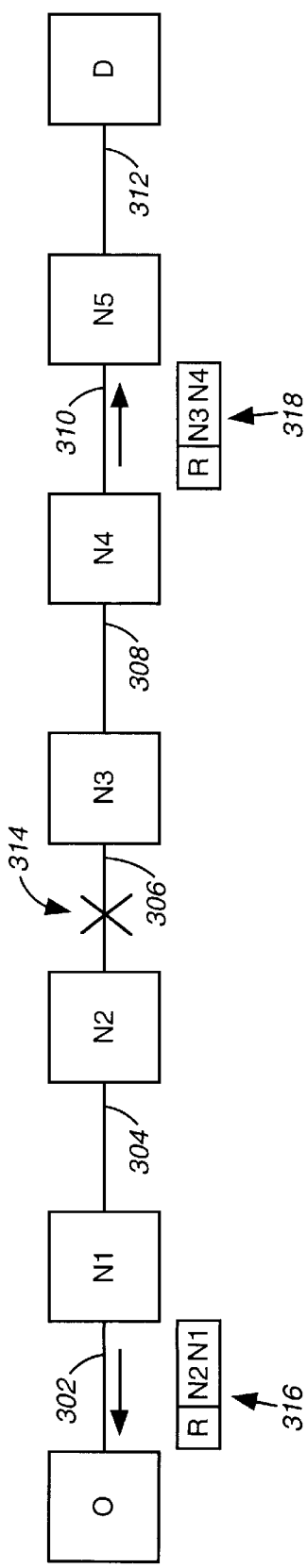
FIG. 47 is another view of the failed path of FIG. 45 in which messages are sent from the intermediate nodes to their respective downstream nodes.

In receipt of reuse message 316, node N1 would append to the route information field its own node ID, before propagating the reuse message onward to the origin node, by way of link 302. Similarly, upon receipt of the reuse message 318, node N4 would append its own node ID to the route information field of reuse message 318, before propagating the reuse message 318 to node N5 by way of link 310. See FIG. 47. Thus, as the reuse message, be it 316 or 318, gets propagated from one node to other nodes downstream thereof, additional node IDs are appended to the message, until the message gets to the end node of the path, for example the origin node shown in FIG. 47. At that point, the origin node reads from the route information field of reuse message 316 to find out what intact portions there are of the failed path. As shown in FIG. 47, origin node can readily ascertain from reuse message 316 that nodes N2 and N1 are the nodes that have forwarded the reuse message. Therefore, the span or links interconnecting those nodes, as well as the span or link that interconnects node N1 to itself are operating properly. Thus, as far as origin node "0" is concerned, the fault that causes the path to fail occurs somewhere beyond node N2, and therefore the elements before node N2 remain usable and can be restricted for use by an alternate route for rerouting the traffic that had been disrupted by fault 314.

Also shown in FIG. 47 is the reuse message 318, as sent by custodial node N3. As shown, reuse message 318 has been propagated by node N4 to node N5. As seen by node N5, reuse message 318 has in its route information field node N3 and node N4. Therefore, node N5 knows that the path connecting it to node N3 remains good. Node N5 then appends its own node ID to the route information field of reuse message 318 before propagating it, via link 312, to the destination node.

Figure 48:
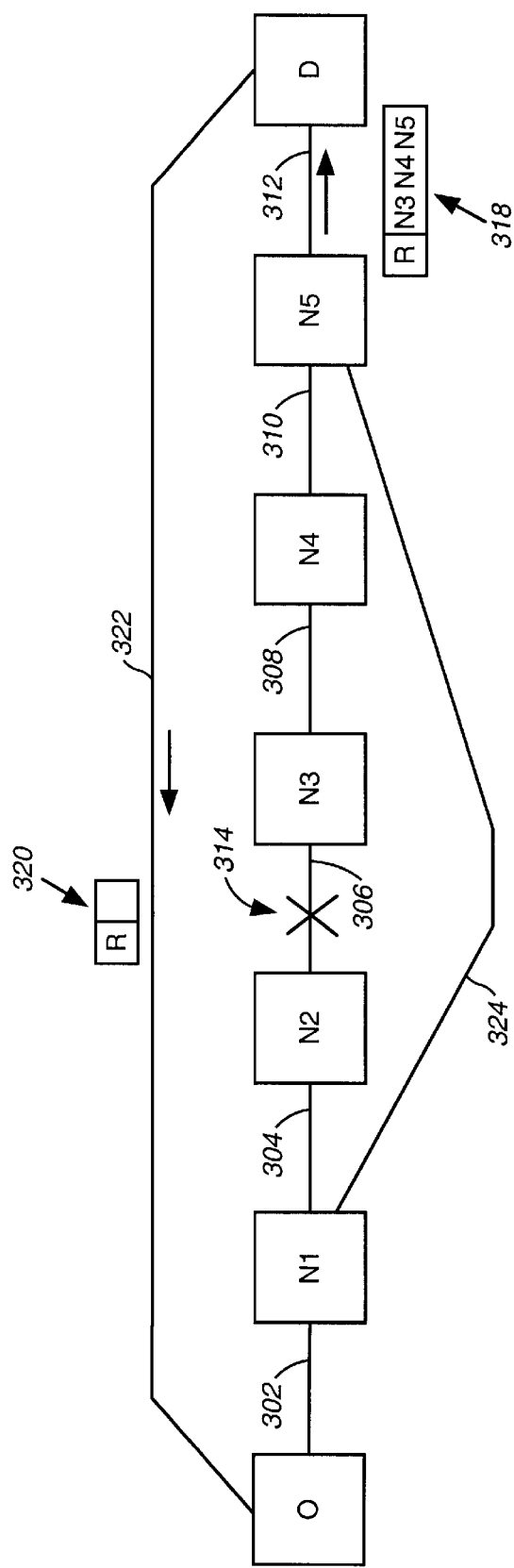
FIG. 48 is the failed path of FIG. 45 showing a message reaching the destination node, the interconnections between the origin and destination nodes, and the use of a spare link for bypassing the fault.
Figure 49:
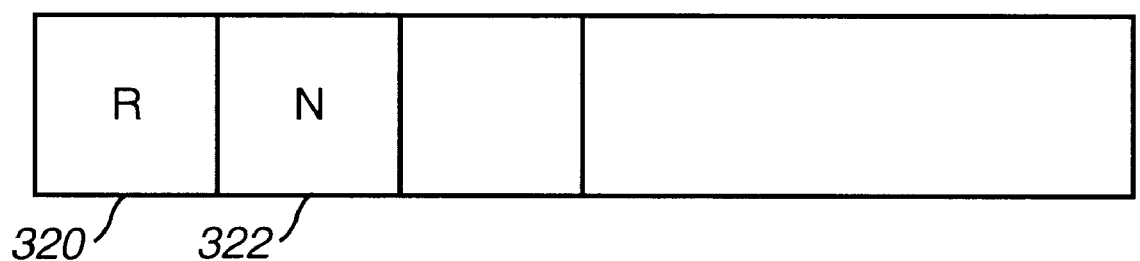
FIG. 49 is an illustration of the reuse message of the present invention.

As shown in FIG. 48, the destination node is now in receipt of reuse message 318. From the route information field of reuse message 318, the destination node can ascertain that fault 314 occurs beyond node N3 and that links 308, 310 and 312 interconnecting nodes N3, N4, N5 remain usable. For the purpose of the instant invention, the conveying of information between the intermediate nodes, such as between nodes N3, N4, N5 and the destination node is done by means of in-band messaging between those nodes. Similarly, the propagation of the reuse message between nodes N2, N1 and the origin nodes are done by in-band messaging.

Once in receipt of reuse message 318, the destination node repackages that reuse message into another "reuse" message 320 and transmits that message to the origin node by means of a wide area network (WAN) messaging connection 322. In receipt of the reuse message 320, the origin node becomes aware of all intact portions of the failed path shown in FIG. 48. It can then formulate an alternate path by using, for example, the spare link 324 that interconnects node N1 to N5. Thus, for the exemplar embodiment shown in FIG. 48, the alternate restoration path is able to use links 302 and 312 of the failed path for rerouting the traffic from the origin node to the destination node. Of course, other alternate route(s) interconnecting the origin node to the destination node could also be used.

In order to enhance the restoration of the failed path once fault 314 is fixed, the useful links of the failed path of FIG. 48 are, for the most part, restricted for routing information from the origin node to the destination node. In other words, in addition to links 302 and 312, intact links 304, 308 and 310 are reserved for the use of the origin node and the destination node for routing data therebetween.

Even though FIG. 48 illustrates that a different reuse message 320 is sent by the destination node to the origin node, it should be appreciated that a reuse message can also be sent from the origin node to the destination node 322 to inform the destination node of links or spans of the failed path that remain functional. In fact, both end nodes of the failed path can inform each other of intact portions of the failed path, if needed.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

What is claimed is:

1. For communicating a description of intact portions of a failed path of a telecommunications network having an origin node and a destination node, a method comprising the steps of:

a) each custodial node, adjacent to the failed portion of said path, providing its node ID in a route information field of a reuse message and sending said reuse message to intermediate nodes downstream thereof;

b) each intermediate-node, upon receipt of said reuse message appending its node ID to said reuse message and sending said reuse message to other nodes downstream thereof; and c) either the origin node or the destination node of said failed path, in receipt of said reuse message, reading from said reuse message the intermediate and custodial node IDs contained therein, wherein the read intermediate and custodial IDs provide the description of the intact portions of said failed path and wherein the intact portions of the failed path are used for restoring only the failed path to a non-failed state.

2. The method of claim 1, wherein said destination node, in receipt of said reuse message, sends a different message to said origin node so that said origin node is informed of the portions of said failed path that remain usable.

3. The method of claim 1, further comprising the step of:

providing an indicator in a message type field of said reuse message for identifying said reuse message.

4. The method of claim 2, wherein said reuse message is sent from said destination node to said origin node by WAN messaging.

5. The method of claim 1, wherein said each custodial node and intermediate node sends said reuse message to nodes downstream thereof by in-band messaging.

6. A method of determining the portions of a failed path that remain usable for carrying traffic despite a failure in said path, comprising the steps of:

a) transmitting, from each custodial node that brackets a fault that causes said path to fail, a message having an identifier identifying said message to be a reuse message and the node ID of said custodial node;

b) appending to said reuse message the node ID of each node of said failed path that receives said reuse message; and c) reading the node IDs in said reuse message when said reuse message reaches either one of the origin node or destination node of said failed path to ascertain the portions of said failed path that remain usable, wherein the portions of said failed path that remain usable are used for restoring only the failed path to a non-failed state.

7. The method of claim 6, further comprising the step of:

providing an indicator in a message type field of said reuse message for identifying said reuse message.

8. The method of claim 7, wherein said reuse message is sent from said one to the other of said origin and destination nodes by WAN messaging.

9. The method of claim 6, wherein said either origin node or destination node, in receipt of said reuse message, sends another message to the other of said either origin node or destination node to inform said other node of the portions of said failed path that remain usable.

10. The method of claim 6, wherein after the node ID of said each node that receives said reuse message is appended to said reuse message, said each node sends said reuse message to nodes downstream thereof by inband messaging.

11. A method of identifying reusable link(s) or span(s) connecting nodes in a failed path of a telecommunications network, comprising the steps of:

a) sending, from each custodial node that brackets a fault, a reuse message to nodes downstream from each custodial node, said reuse message including the node ID of said each custodial node;

b) appending to said reuse message the node ID of each node downstream of said each custodial node said reuse message reaches;

c) reading the node IDs appended thereto when said reuse message reaches either of the end nodes that define the ends of said failed path; and d) determining the links or spans connecting adjacent nodes whose IDs are appended to said reuse message as usable links, wherein the portions of said failed path that remain usable are used for restoring only the failed path to a non-failed state.

12. The method of claim 11, wherein either of said end nodes, in receipt of said reuse message, sends a different reuse message to the other of said end nodes to inform the other end node the links or spans of said failed path are usable by an alternate path to rerouted disrupted traffic.

13. The method of claim 11, further comprising the step of:

providing an indicator in a message type field of said reuse message for identifying said reuse message.

14. The method of claim 11, wherein said reuse message is sent from said one to the other of said end nodes by WAN messaging.

15. The method of claim 11, wherein the sending of said reuse message by said custodial nodes and nodes downstream thereof is by in-band messaging.

16. The method of claim 1 further comprising the step of:

applying the intact portions of said failed path exclusively for restoring said failed path.

* * * * *